United States Patent
Holtcamp et al.

(10) Patent No.: US 11,718,635 B2
(45) Date of Patent: Aug. 8, 2023

(54) IRON BIS(IMINO) ARYL CATALYSTS AND METHODS THEREOF

(71) Applicant: ExxonMobil Chemical Patents Inc., Baytown, TX (US)

(72) Inventors: Matthew W. Holtcamp, Huffman, TX (US); Robert L. Halbach, Baytown, TX (US); Subramaniam Kuppuswamy, Mont Belvieu, TX (US); Matthew S. Bedoya, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 259 days.

(21) Appl. No.: 17/119,161

(22) Filed: Dec. 11, 2020

(65) Prior Publication Data

US 2021/0179650 A1 Jun. 17, 2021

Related U.S. Application Data

(60) Provisional application No. 62/948,681, filed on Dec. 16, 2019.

(51) Int. Cl.
| | |
|---|---|
| *C08F 4/70* | (2006.01) |
| *C07F 15/00* | (2006.01) |
| *C07F 15/02* | (2006.01) |
| *C08F 210/16* | (2006.01) |

(52) U.S. Cl.
CPC .......... *C07F 15/025* (2013.01); *C08F 4/7042* (2013.01); *C08F 210/16* (2013.01); *C07F 15/02* (2013.01)

(58) Field of Classification Search
CPC ....... C07F 15/025; C07F 15/02; C08F 4/7042
See application file for complete search history.

(56) References Cited

U.S. PATENT DOCUMENTS

| | | | |
|---|---|---|---|
| 6,175,409 B1 | 1/2001 | Nielsen et al. | 356/337 |
| 6,260,407 B1 | 7/2001 | Petro et al. | 73/61.52 |
| 6,294,388 B1 | 9/2001 | Petro | 436/8 |
| 6,406,632 B1 | 6/2002 | Safir et al. | 210/656 |
| 6,436,292 B1 | 8/2002 | Petro | 210/656 |
| 6,454,947 B1 | 9/2002 | Safir et al. | 210/656 |
| 6,461,515 B1 | 10/2002 | Safir et al. | 210/656 |
| 6,475,391 B2 | 11/2002 | Safir et al. | 210/656 |
| 6,491,816 B2 | 12/2002 | Petro | 210/198.2 |
| 6,491,823 B1 | 12/2002 | Safir et al. | 210/656 |
| 8,252,875 B2 * | 8/2012 | Mihan | C07F 15/025 502/103 |
| 2019/0144577 A1 | 5/2019 | Holtcamp et al. | C08F 210/16 |

FOREIGN PATENT DOCUMENTS

| | | | |
|---|---|---|---|
| EP | 2003166 | 12/2008 | C08L 23/08 |
| WO | WO 2007/080081 | 7/2007 | C07D 213/53 |
| WO | WO2008/107135 | 9/2008 | B01J 31/18 |
| WO | WO2011/089000 | 7/2011 | C08F 110/02 |

OTHER PUBLICATIONS

Campora, J.; Macros Naz, A.; Palma, P.; Alvarez, E. Organometallics 2005, 24, 4878-4881. (Year: 2005).*
Bryliakov, K. P. et al. (2004) "Active Intermediates of Ehtylene Polymerization over 2,6-Bis(imino)pydridyl Iron Complex Activated with Aluminum Trialkyls and Methylaluminoxane," *Organometallics*, v.23(2), pp. 5375-5378.
Cámpora, J., et al. (2005) "2,6-Diiminopyridine Iron(II) Dialkyl Complexes. Interaction with Aluminum Alkyls and Ethylene Polymerization Catalysis" *Organometallics*, v.24(21), pp. 4878-4881.
Small, B. L. (2015) "Discovery and Development of Pyridine-bis(imine) and Related Catalysts for Olefin Polymerization and Oligomerization" *Acc. Chem. Res.*, v.48, pp. 2599-2611.
Zhang, W. et al. (2013) "Tailoring Iron Complexes for Ethylene Oligomerization and/or Polymerization," *Dalton Trans.*, v.42, pp. 8988-8997.

* cited by examiner

*Primary Examiner* — Rip A Lee
(74) *Attorney, Agent, or Firm* — ExxonMobil Technology and Engineering Company-Chemicals

(57) ABSTRACT

The present disclosure related to iron-containing compounds including a 2,6-diiminoaryl ligand and one or more substituted hydrocarbyl substituents. Catalysts, catalyst systems, and processes of the present disclosure can provide polyolefins with high or low molecular weight, low comonomer content, narrow polydispersity indices, and broad orthogonal composition distribution. The present disclosure provides new and improved iron-containing catalysts with enhanced solubility in hydrophobic (nonpolar) solvents.

20 Claims, No Drawings

IRON BIS(IMINO) ARYL CATALYSTS AND METHODS THEREOF

CROSS REFERENCE TO RELATED APPLICATIONS

This application claims priority to U.S. Ser. No. 62/948,681, filed Dec. 16, 2019, herein incorporated by reference.

FIELD

The present disclosure relates 2,6-bis(imino)pyridyl iron compounds, catalyst systems comprising such compounds, and uses thereof.

BACKGROUND

Olefin polymerization catalysts are of great use in industry and polyolefins are widely used commercially because of their robust physical properties. Hence, there is interest in finding new catalyst systems that increase the marketing value of the catalyst and allow the production of polymers having improved properties.

Useful polyolefins, such as polyethylene, typically have a comonomer, such as hexene, incorporated into the polyethylene backbone. These copolymers provide varying physical properties compared to polyethylene alone and are typically produced in a low pressure reactor, utilizing, for example, solution, slurry, or gas phase polymerization processes. Polymerization may take place in the presence of catalyst systems such as those employing a Ziegler-Natta catalyst, a chromium based catalyst, or a metallocene catalyst. The comonomer content of a polyolefin (e.g., wt % of comonomer incorporated into a polyolefin backbone) influences the properties of the polyolefin (and composition of the copolymers) and is influenced by the polymerization catalyst.

A copolymer composition, such as a resin, has a composition distribution, which refers to the distribution of comonomer that forms short chain branches along the copolymer backbone. When the amount of short chain branches varies among the copolymer molecules, the composition is said to have a "broad" composition distribution. When the amount of comonomer per 1,000 carbons is similar among the copolymer molecules of different chain lengths, the composition distribution is said to be "narrow".

Like comonomer content, the composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

Also, like comonomer content, a composition distribution of a copolymer composition is influenced by the identity of the catalyst used to form the polyolefins of the composition.

Iron-containing catalysts have been shown to be high activity catalysts capable of forming polyethylene. Typical iron-containing catalysts have a nitrogen atom of a heterocyclic moiety (such as pyridine) that chelates the iron atom. More specifically, iron-containing catalysts are typically tridentate in that they have a pyridyl ligand and two imine ligands that each chelate the iron atom. Chelation of a nitrogen atom of the pyridyl and imine ligands to the iron atom occurs via the lone pair of π-electrons on each of the nitrogen atoms. Such iron-containing catalysts, for example 2,6-bis(imino)pyridyliron(II) dihalide, typically provide low molecular weight polymers. (W. Zhang, et al. (2013) "Tailoring Iron Complexes for Ethylene Oligomerization and/or Polymerization," *Dalton Trans.*, v. 42, pp. 8988-8997; B. L. Small, (2015) "Discovery and Development of Pyridine-bis (imine) and Related Catalysts for Olefin Polymerization and Oligomerization" *Acc. Chem. Res., v.* 48, pp. 2599-2611). Other iron-containing catalysts include 2-[1-(2,6-dibenzhydryl-4-methylphenylimino)ethyl]-6-[1-(aryl-imino)-ethyl] pyridyl iron catalysts. Some of these catalysts have relatively high activity but produce low molecular weight polymers and don't incorporate linear alpha olefins with narrow molecular weight distribution. Commonly, such iron-containing catalysts have low/poor solubility in hydrophobic solvents used in polymerizations, such as gas phase polymerizations to form polyethylenes. Without being bound by theory, it is believed that the solubility of the iron-containing catalysts affects the effectiveness of the polymerization, such as the molecular weight, comonomer incorporation, and molecular weight distribution of the polymer products. Moreover, due to the low solubility of iron-containing catalysts in hydrophobic solvents, the use of such catalysts for production of mixed catalyst systems, such as combination with metallocenes, is very limited.

There is a need for catalysts capable of forming polyolefins. In particular, there is a need to develop new and improved iron-containing catalysts with enhanced solubility capable of forming polymers having high or low molecular weight, low molecular weight, low comonomer content, and narrow molecular weight distribution.

References for citing in an Information Disclosure Statement (37 CFR 1.97(h): Cámpora, J., et al. (2005) "2,6-Diiminopyridine Iron(II) Dialkyl Complexes. Interaction with Aluminum Alkyls and Ethylene Polymerization Catalysis" *Organometallics, v.* 24(21), pp. 4878-4881; EP 2 003 166 A1; WO 2007/080081 A2; 2017EM354-PROV.

SUMMARY

The present disclosure relates to catalyst compounds represented by Formula (I):

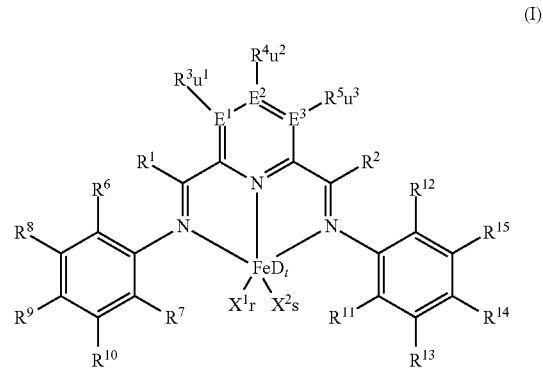

wherein:
each of $R^1$ and $R^2$ is independently hydrogen, $C_1$-$C_{22}$ alkyl, $C_2$-$C_{22}$ alkenyl, $C_6$-$C_{22}$ aryl, arylalkyl wherein alkyl has from 1 carbon atom to 10 carbon atoms and aryl has from 6 carbon atoms to 20 carbon atoms, or five-, or six-, or seven-membered heterocyclic ring comprising at least one atom selected from the group consisting of N, P, O and S; wherein each of $R^1$ and $R^2$ is optionally substituted by halogen, —$OR^{16}$, —$NR^{17}_2$, or —$SiR^{18}_3$; wherein $R^1$ optionally bonds with $R^3$, and $R^2$ optionally bonds with $R^5$, in each case to independently form a five-, six-, or seven-membered ring;

each of $R^3$, $R^4$, $R^5$, $R^8$, $R^9$, $R^{10}$, $R^{13}$, $R^{14}$, and $R^{15}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, —$OR^{16}$, —$NR^{17}_2$, halogen, —$SiR^{18}3$ or five-, six- or seven-membered heterocyclic ring comprising at least one atom selected from the group consisting of N, P, O and S;

wherein $R^3$, $R^4$, $R^5$, $R^8$, $R^9$, $R^{10}$, $R^{13}$, $R^{14}$, and $R^{15}$ are optionally substituted by halogen, —$OR^{16}$, —$NR^{17}_2$, or —$SiR^{18}_3$; wherein $R^3$ optionally bonds with $R^4$, $R^4$ optionally bonds with $R^5$, $R^7$ optionally bonds with $R^{10}$, $R^{10}$ optionally bonds with $R^9$, $R^9$ optionally bonds with $R^8$, $R^8$ optionally bonds with $R^6$, $R^{15}$ optionally bonds with $R^{14}$, $R^{14}$ optionally bonds with $R^{13}$, and $R^{13}$ optionally bonds with $R^{11}$, in each case to independently form a five-, six- or seven-membered carbocyclic or heterocyclic ring, the heterocyclic ring comprising at least one atom from the group consisting of N, P, O and S;

each of $R^6$, $R^7$, $R^{11}$, and $R^{12}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, a heteroatom or a heteroatom-containing group (such as —$OR^{16}$, —$NR^{17}_2$, halogen, —$SiR^{18}_3$ or five-, six- or seven-membered heterocyclic ring comprising at least one atom selected from the group consisting of N, P, O and S); wherein $R^6$, $R^7$, $R^{11}$, and $R^{12}$ are optionally substituted by halogen, —$OR^{16}$, —$NR^{17}_2$, or —$SiR^{18}_3$, wherein $R^6$ optionally bonds with $R^8$, $R^{11}$ optionally bonds with $R^1$, or $R^{15}$ optionally bonds with $R^{12}$ in each case to independently form a five-, six- or seven-membered carbocyclic or heterocyclic ring, the heterocyclic ring comprising at least one atom from the group consisting of N, P, O and S; wherein at least one of $R^6$, $R^7$, $R^{11}$, and $R^{12}$ is independently a heteroatom or a heteroatom-containing group, or at least one of the $R^6$, $R^7$, $R^{11}$, and $R^{12}$ is not methyl, or if $R^{11}$ is H and $R^{12}$ is iPr, then at least one of $R^6$ and $R^7$ is not methyl;

each of $R^{16}$, $R^{17}$, and $R^{18}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or —$SiR^{19}_3$, wherein each $R^{16}$, $R^{17}$, and $R^{18}$ is independently optionally substituted by halogen, or two $R^{16}$ radicals optionally bond to form a five- or six-membered ring, or two $R^{17}$ radicals optionally bond to form a five- or six-membered ring, or two $R^{18}$ radicals optionally bond to form a five- or six-membered ring;

each $R^{19}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or two $R^{19}$ radicals optionally bond to form a five- or six-membered ring;

each of $E^1$, $E^2$, and $E^3$ is independently carbon, nitrogen or phosphorus;

each of $u^1$, $u^2$, and $u^3$ is independently 0 if $E^1$, $E^2$, or $E^3$ is nitrogen or phosphorus, and each of $u^1$, $u^2$, and $u^3$ is independently 1 if $E^1$, $E^2$, or $E^3$ is carbon;

each of $X^1$ and $X^2$ is independently substituted hydrocarbyl, and the radicals X can be bonded with one another;

r is 1 or 2;
s is 1 or 2;
D is a neutral donor; and
t is 0 to 2.

In yet another embodiment, the present disclosure provides a catalyst system including an activator and a catalyst compound of the present disclosure.

In still another embodiment, the present disclosure provides a polymerization process including contacting one or more olefin monomers with a catalyst system including an activator and a catalyst of the present disclosure.

In still another embodiment, the present disclosure provides a polyolefin formed by a catalyst system and or method of the present disclosure.

DETAILED DESCRIPTION

Catalyst compounds of the present disclosure are iron-containing compounds including a 2,6-diiminoaryl ligand and one or more substituted hydrocarbyl substituents. Catalyst compounds of the present disclosure can be soluble in hydrophobic (nonpolar) solvents and may be capable of forming polymers having low comonomer content and narrow molecular weight distribution. Additionally or alternatively, the molecular weight of polymers formed by catalyst compounds of the present disclosure can be substantially or completely unaffected during a polymerization process in the presence of hydrogen in a polymerization reactor. The inertness of the polymers towards hydrogen makes catalyst compounds of the present disclosure good candidates for use in mixed catalyst systems (e.g., a catalyst system having an iron catalyst and a metallocene catalyst) because the molecular weight of the polymer formed by the second catalyst (e.g., metallocene catalyst) can be tailored using hydrogen in the reactor while the molecular weight of polymers formed by iron catalysts of the present disclosure in the mixed catalyst system remains substantially or completely unaffected by the hydrogen in the reactor. Thus, the molecular weight of the high molecular weight component of the polymer product (of the mixed catalyst system) is tunable while the molecular weight of the low molecular weight component can be substantially or completely unaffected.

In at least one embodiment, catalyst compounds of the present disclosure are also asymmetric, having an electron donating side of the catalyst and an electron deficient side of the catalyst. Furthermore, catalyst compounds of the present disclosure can produce polyolefin polymers with tailored molecular weight (e.g., high molecular weight polyolefin polymers, with an Mw value of 100,000 g/mol or more, or low molecular weight polyolefin polymers, with an Mw value of less that 100,000 g/mol).

In another class of embodiments, the present disclosure is directed to polymerization processes to produce polyolefin polymers from catalyst systems including one or more olefin polymerization catalysts, at least one activator, and an optional support.

For example, the present disclosure is directed to a polymerization process to produce a polyethylene polymer, the process including contacting a catalyst system including: (1) one or more iron-containing compounds catalysts including a 2,6-diiminoaryl ligand and one or more substituted hydrocarbyl substituents, (2) at least one activator, and (3) optionally at least one support, with ethylene and one or more $C_3$-$C_{10}$ alpha-olefin comonomers under polymerization conditions.

Catalyst compounds, catalyst systems, and processes of the present disclosure can provide polyolefins at Mw values of from about 10,000 g/mol to about 500,000 g/mol, Mn values from about 1,000 g/mol to about 300,000 g/mol, PDI (e.g., about 1.5 to about 6), and or high Mz values (e.g., 500,000 g/mol or greater). Alternatively, catalysts, catalyst systems, and processes of the present disclosure can provide polyolefins at low Mw (e.g., less than 100,000 g/mol), Mn values of less than 100,000 g/mol, Mz values from about 10,000 g/mol to about 1,500,000 g/mol, and or PDI of about 1 to 6. Catalysts, catalyst systems, and processes of the present disclosure can provide polymers having a comonomer content from about 0.00001 wt % to about 8 wt %.

The specification describes group 8 metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and or electron donation coordination or intermediate bonds. The transition metal complexes are generally subjected to activation to perform their polymerization or oligomerization function using an activator which, without being bound by theory, is believed to create a cation as a result of the removal of an anionic group, often referred to as a leaving group, from the transition metal.

As used herein, an "electron deficient side" or "electron withdrawing side" of a catalyst can be a portion of a catalyst that has one or more electron withdrawing groups (such as one, two, three, or more) such that the electron deficient side withdraws electron density toward it and away from an opposing (e.g., electron rich) side of the catalyst.

As used herein, an "electron rich side" or "electron donating side" of a catalyst can be a portion of a catalyst that has one or more electron donating groups (such as one, two, three, or more) such that the electron rich side donates electron density toward an opposing, electron deficient side of the catalyst.

For the purposes of the present disclosure, the numbering scheme for the Periodic Table Groups is used as described in *Chemical and Engineering News*, v. 63(5), pg. 27 (1985). Therefore, a "Group 8 metal" is an element from Group 8 of the Periodic Table, e.g., Fe.

The following abbreviations may be used herein: Me is methyl, Et is ethyl, Ph is phenyl, tBu is tertiary butyl, PDI is polydispersity index, MAO is methylalumoxane, SMAO is supported methylalumoxane, TnOAl is tri-n-octylaluminum, NMR is nuclear magnetic resonance, ppm is part per minute, THF is tetrahydrofuran, RPM is rotation per minute.

As used herein, "olefin polymerization catalyst(s)" refers to any catalyst, such as an organometallic complex or compound that is capable of coordination polymerization addition where successive monomers are added in a monomer chain at the organometallic active center.

The terms "substituent," "radical," "group," and "moiety" may be used interchangeably.

"Conversion" is the amount of monomer that is converted to polymer product, and is reported as mol % and is calculated based on the polymer yield and the amount of monomer fed into the reactor.

An "olefin," alternatively referred to as "alkene," is a linear, branched, or cyclic compound of carbon and hydrogen having at least one double bond. For purposes of this specification and the claims appended thereto, when a polymer or copolymer is referred to as including an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" is used to refer to mer units indicates that the mer units differ from each other by at least one atom or are different isomerically. Accordingly, the definition of copolymer, as used herein, includes terpolymers. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on.

The term "alpha-olefin" refers to an olefin having a terminal carbon-to-carbon double bond in the structure thereof ((R"R'")—C=$CH_2$, where R" and R'" can be independently hydrogen or any hydrocarbyl group; such as R" is hydrogen and R'" is an alkyl group). A "linear alpha-olefin" is an alpha-olefin defined in this paragraph wherein R" is hydrogen, and R is hydrogen or a linear alkyl group.

For the purposes of the present disclosure, ethylene shall be considered an alpha-olefin.

As used herein, and unless otherwise specified, the term "$C_n$" means hydrocarbon(s) having n carbon atom(s) per molecule, wherein n is a positive integer. The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and or unsaturated), including mixtures of hydrocarbon compounds having different values of n. Likewise, a "$C_m$-$C_y$" group or compound refers to a group or compound including carbon atoms at a total number thereof from m to y. Thus, a $C_1$-$C_{50}$ alkyl group refers to an alkyl group including carbon atoms at a total number thereof from about 1 to about 50.

Unless otherwise indicated, (e.g., the definition of "substituted hydrocarbyl", "substituted aromatic", etc.), the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)_q$—$SiR^*_3$, where q is 1 to 10 and each $R^*$ is independently a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)_q$—$SiR^*_3$, where q is 1 to 10 and each $R^*$ is independently a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring. The term "hydrocarbyl substituted phenyl" means a phenyl group having 1, 2, 3, 4 or 5 hydrogen groups replaced by a hydrocarbyl or substituted hydrocarbyl group. For example, the "hydrocarbyl substituted phenyl" group can be represented by the formula:

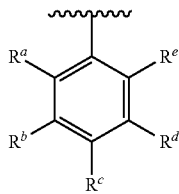

where each of $R^a$, $R^b$, $R^c$, $R^d$, and $R^e$ can be independently selected from hydrogen, $C_1$-$C_{40}$ hydrocarbyl or $C_1$-$C_{40}$ substituted hydrocarbyl, a heteroatom or a heteroatom-containing group (provided that at least one of $R^a$, $R^b$, $R^c$, $R^d$, and $R^e$ is not H), or two or more of $R^a$, $R^b$, $R^c$, $R^d$, and $R^e$ can be joined together to form a $C_4$-$C_{62}$ cyclic or polycyclic hydrocarbyl ring structure, or a combination thereof.

The term "substituted aromatic," means an aromatic group having 1 or more hydrogen groups replaced by a hydrocarbyl, substituted hydrocarbyl, heteroatom or heteroatom containing group.

The term "substituted phenyl," mean a phenyl group having 1 or more hydrogen groups replaced by a hydrocarbyl, substituted hydrocarbyl, heteroatom or heteroatom containing group.

The term "substituted naphthyl," means a naphthyl group having 1 or more hydrogen groups replaced by a hydrocarbyl, substituted hydrocarbyl, heteroatom or heteroatom containing group.

The term "substituted benzyl" means a benzyl group having 1 or more hydrogen groups replaced by a hydrocarbyl, substituted hydrocarbyl, heteroatom or heteroatom containing group, such as a substituted benzyl group is represented by the formula:

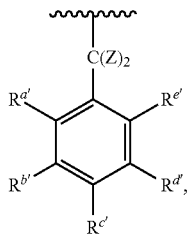

where each of $R^{a'}$, $R^{b'}$, $R^{c'}$, $R^{d'}$, and $R^{e'}$ and Z is independently selected from hydrogen, $C_1$-$C_{40}$ hydrocarbyl or $C_1$-$C_{40}$ substituted hydrocarbyl, a heteroatom or a heteroatom-containing group (provided that at least one of $R^{a'}$, $R^{b'}$, $R^{c'}$, $R^{d'}$, and $R^{e'}$ and Z is not H), or two or more of $R^{a'}$, $R^{b'}$, $R^{c'}$, $R^{d'}$, and $R^{e'}$ and Z are joined together to form a $C_4$-$C_{62}$ cyclic or polycyclic ring structure, or a combination thereof.

The terms "alkoxy" and "alkoxide" mean an alkyl or aryl group bound to an oxygen atom, such as an alkyl ether or aryl ether group/radical connected to an oxygen atom and can include those where the alkyl/aryl group is a $C_1$ to $C_{10}$ hydrocarbyl. The alkyl group may be straight chain, branched, or cyclic. The alkyl group may be saturated or unsaturated. Examples of suitable alkoxy radicals can include methoxy, ethoxy, n-propoxy, iso-propoxy, n-butoxy, iso-butoxy, sec-butoxy, tert-butoxy, phenoxyl.

The term "alkenyl" means a straight-chain, branched-chain, or cyclic hydrocarbon radical having one or more double bonds. These alkenyl radicals may be optionally substituted. Examples of suitable alkenyl radicals can include ethenyl, propenyl, allyl, 1,4-butadienyl, cyclopropenyl, cyclobutenyl, cyclopentenyl, cyclohexenyl, cyclooctenyl, including their substituted analogues.

The terms "alkyl radical," and "alkyl" are used interchangeably throughout this disclosure. For purposes of this disclosure, "alkyl radical" is defined to be $C_1$-$C_{100}$ alkyls that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, including their substituted analogues. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, or —(CH$_2$)—SiR*$_3$, and each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "aryl" or "aryl group" means an aromatic ring and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom-substituted ring. Other examples of heterocycles may include pyridine, imidazole, and thiazole.

The terms "hydrocarbyl radical," "hydrocarbyl group," or "hydrocarbyl" may be used interchangeably and are defined to mean a group including hydrogen and carbon atoms only. For example, a hydrocarbyl can be a $C_1$-$C_{100}$ radical that may be linear, branched, or cyclic, and when cyclic, aromatic or non-aromatic. Examples of such radicals may include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and aryl groups, such as phenyl, benzyl, naphthyl.

Unless otherwise indicated, as used herein, "low comonomer content" is defined as a polyolefin having less than 8 wt % of comonomer based upon the total weight of the polyolefin. As used herein, "high comonomer content" is defined as a polyolefin having greater than or equal to 8 wt % of comonomer based upon the total weight of the polyolefin.

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are g/mol.

Unless otherwise indicated, as used herein, "high molecular weight" is defined as a weight average molecular weight (Mw) value of 100,000 g/mol or more. "Low molecular weight" is defined as an Mw value of less than 100,000 g/mol.

Unless otherwise noted all melting points (Tm) are differential scanning calorimetry (DSC) first heat.

A "catalyst system" is a combination of at least one catalyst compound, at least one activator, an optional coactivator, and an optional support material. The terms "catalyst compound", "catalyst complex", "transition metal complex", "transition metal compound", "precatalyst compound", and "precatalyst complex" are used interchangeably. When "catalyst system" is used to describe such a pair before activation, it means the unactivated catalyst complex (precatalyst) together with an activator and, optionally, a coactivator. When it is used to describe such a pair after activation, it means the activated complex and the activator or other charge-balancing moiety. The transition metal compound may be neutral as in a precatalyst, or a charged species with a counter ion as in an activated catalyst system. For the purposes of the present disclosure and the claims thereto, when catalyst systems are described as including neutral stable forms of the components, it is well understood by one of ordinary skill in the art, that the ionic form of the component is the form that reacts with the monomers to produce polymers. A polymerization catalyst system is a catalyst system that can polymerize monomers to polymer. Furthermore, catalyst compounds and activators represented by formulae herein are intended to embrace both neutral and ionic forms of the catalyst compounds and activators.

In the description herein, the catalyst may be described as a catalyst, a catalyst precursor, a pre-catalyst compound, catalyst compound or a transition metal compound, and these terms are used interchangeably.

An "anionic ligand" is a negatively charged ligand which donates one or more pairs of electrons to a metal ion. A "Lewis base" is a neutrally charged ligand which donates one or more pairs of electrons to a metal ion. Examples of Lewis bases include ethylether, trimethylamine, pyridine, tetrahydrofuran, dimethylsulfide, and triphenylphosphine. The term "heterocyclic Lewis base" refers to Lewis bases that are also heterocycles. Examples of heteroyclic Lewis bases include pyridine, imidazole, thiazole, and furan.

A scavenger is a compound that can be added to facilitate polymerization by scavenging impurities. Some scavengers may also act as activators and may be referred to as coactivators. A coactivator, that is not a scavenger, may also be used in conjunction with an activator in order to form an active catalyst. In at least one embodiment, a coactivator can be pre-mixed with the transition metal compound to form an alkylated transition metal compound.

Noncoordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. A Lewis acid is defined to be a compound or element that can react with an electron donor to form a bond. An NCA coordinates weakly enough that a Lewis base, such as an olefin monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon.

The term "continuous" means a system that operates without interruption or cessation. For example a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization can be homogeneous. A homogeneous polymerization is one where the polymer product is dissolved in the polymerization medium. Suitable systems may be not turbid as described in Oliveira, J. V. et al. (2000) *Ind. Eng. Chem. Res.*, v. 29, p. 4627.

A bulk polymerization means a polymerization process in which the monomers and or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, such as less than 10 wt %, such as less than 1 wt %, such as 0 wt %.

Transition Metal Complexes

In at least one embodiment, the present disclosure provides iron-containing catalysts having an aryl ligand.

The present disclosure relates to catalyst compounds represented by Formula (I):

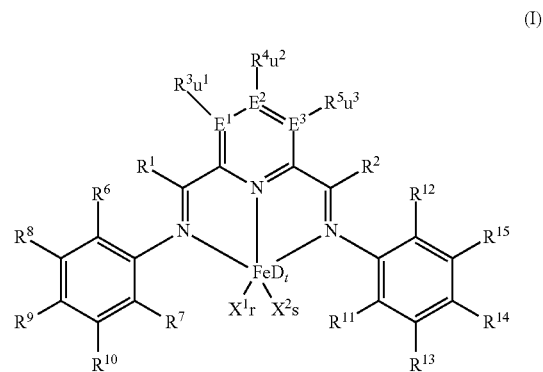

wherein:

each of $R^1$ and $R^2$ is independently hydrogen, $C_1$-$C_{22}$ alkyl, $C_2$-$C_{22}$ alkenyl, $C_6$-$C_{22}$ aryl, arylalkyl wherein alkyl has from 1 carbon atom to 10 carbon atoms and aryl has from 6 carbon atoms to 20 carbon atoms, or five-, or six-, or seven-membered heterocyclic ring comprising at least one atom selected from the group consisting of N, P, O and S; wherein each of $R^1$ and $R^2$ is optionally substituted by halogen, —$OR^{16}$, —$NR^{17}{}_2$, or —$SiR^{18}{}_3$; wherein $R^1$ optionally bonds with $R^3$, and $R^2$ optionally bonds with $R^5$, in each case to independently form a five-, six-, or seven-membered ring;

each of $R^3$, $R^4$, $R^5$, $R^8$, $R^9$, $R^{10}$, $R^{13}$, $R^{14}$, and $R^{15}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, —$OR^{16}$, —$NR^{17}{}_2$, halogen, —$SiR^1 83$ or five-, six- or seven-membered heterocyclic ring comprising at least one atom selected from the group consisting of N, P, O and S; wherein $R^3$, $R^4$, $R^5$, $R^8$, $R^9$, $R^{10}$, $R^{13}$, $R^{14}$, and $R^{15}$ are optionally substituted by halogen, —$OR^{16}$, —$NR^{17}{}_2$, or —$SiR^{18}{}_3$; wherein $R^3$ optionally bonds with $R^4$, $R^4$ optionally bonds with $R^5$, $R^7$ optionally bonds with $R^{10}$, $R^8$ optionally bonds with $R^9$, $R^9$ optionally bonds with $R^8$, $R^8$ optionally bonds with $R^6$, $R^{15}$ optionally bonds with $R^{14}$, $R^{14}$ optionally bonds with $R^{13}$, and $R^{13}$ optionally bonds with $R^{11}$, in each case to independently form a five-, six- or seven-membered carbocyclic or heterocyclic ring, the heterocyclic ring comprising at least one atom from the group consisting of N, P, O and S;

each of $R^6$, $R^7$, $R^{11}$, and $R^{12}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, a heteroatom or a heteroatom-containing group (such as —$OR^{16}$, —$NR^{17}{}_2$, halogen, —$SiR^{18}{}_3$ or five-, six- or seven-membered heterocyclic ring including at least one atom selected from the group consisting of N, P, O and S); wherein $R^6$, $R^7$, $R^{11}$, and $R^{12}$ are optionally substituted by halogen, —$OR^{16}$, —$NR^{17}{}_2$, or —$SiR^{18}{}_3$, wherein $R^6$ optionally bonds with $R^8$, $R^{11}$ optionally bonds with $R^{13}$, or $R^{15}$ optionally bonds with $R^{12}$ in each case to independently form a five-, six- or seven-membered carbocyclic or heterocyclic ring, the heterocyclic ring including at least one atom from the group consisting of N, P, O and S; wherein at least one of $R^6$, $R^7$, $R^{11}$, and $R^{12}$ is independently a heteroatom or a heteroatom-containing group, or at least one of the $R^6$, $R^7$, $R^{11}$, and $R^{12}$ is not methyl, or if $R^{11}$ is H and $R^{12}$ is iPr, then at least one of $R^6$ and $R^7$ is not methyl;

each of $R^{16}$, $R^{17}$, and $R^{18}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or —$SiR^{19}{}_3$, wherein each $R^{16}$, $R^{17}$, and $R^{18}$ is independently optionally substituted by halogen, or two $R^{16}$ radicals optionally bond to form a five- or six-membered ring, or two $R^{17}$ radicals optionally bond to form a five- or six-membered ring, or two $R^{18}$ radicals optionally bond to form a five- or six-membered ring;

each $R^{19}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or two $R^{19}$ radicals optionally bond to form a five- or six-membered ring;

each of $E^1$, $E^2$, and $E^3$ is independently carbon, nitrogen or phosphorus;

each of $u^1$, $u^2$, and $u^3$ is independently 0 if $E^1$, $E^2$, or $E^3$ is nitrogen or phosphorus, and each of $u^1$, $u^2$, and $u^3$ is independently 1 if $E^1$, $E^2$, or $E^3$ is carbon;

each of $X^1$ and $X^2$ is independently substituted hydrocarbyl, and the radicals X can be bonded with one another;

r is 1 or 2;

s is 1 or 2;

D is a neutral donor; and t is 0 to 2.

In at least one embodiment, each of $R^1$ and $R^2$ is independently $C_1$-$C_{22}$ alkyl or $C_6$-$C_{22}$ aryl wherein each of $R^1$ and $R^2$ is optionally substituted by halogen. One or more of $R^1$ and $R^2$ may be independently selected from methyl, ethyl, propyl, butyl, pentyl, hexyl, heptyl, octyl, nonyl, decyl, undecyl, dodecyl, phenyl, substituted phenyl, biphenyl or an isomer thereof, which may be halogenated (such as perfluoropropyl, perfluorobutyl, perfluoroethyl, perfluoromethyl), substituted hydrocarbyl radicals and all isomers of substituted hydrocarbyl radicals including trimethylsilylpropyl, trimethylsilylmethyl, trimethylsilylethyl, phenyl, or all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, or dipropylmethylphenyl. In at least one embodiment, $R^1$ and $R^2$ are methyl.

In at least one embodiment, t is 0, in which case D is absent. In an alternate embodiment, D is a neutral donor such as a neutral Lewis base, such as, for example, amines, alcohols, ethers, ketones, aldehydes, esters, sulfides or phosphines, which can be bonded with the iron center or can still be contained in the complex as residual solvent from the preparation of the iron complexes.

In at least one embodiment, the catalyst compound represented by Formula (I) has an electron donating side. At least one of $R^6$ or $R^7$ is independently halogen, —$CF_3$, —$OR^{16}$, —$NR^{17}{}_2$, or —$SiR^{18}{}_3$. For example, at least one of $R^6$ or $R^7$ can independently be selected from fluorine, chlorine, bromine, or iodine. $R^8$, $R^9$, and $R^{10}$ can be independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, —$OR^{16}$, —$NR^{17}{}_2$, halogen, —$SiR^{18}{}_3$ or five-, six- or seven-membered heterocyclic ring including at least one atom selected from the group consisting of N, P, O and S; wherein $R^8$, $R^9$, and $R^{10}$ are optionally substituted by halogen, —$OR^{16}$, —$NR^{17}{}_2$, or —$SiR^{18}{}_3$.

Each of $R^{16}$ and $R^{17}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —$SiR^{18}{}_3$, wherein $R^{16}$ and or $R^{17}$ is optionally substituted by halogen, or two $R^{16}$ and $R^{17}$ radicals optionally bond to form a five- or six-membered ring. Each $R^{18}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two $R^{18}$ radicals optionally bond to form a five-six-membered ring.

In at least one embodiment, each of $R^3$, $R^4$, $R^5$ is independently selected from hydrogen, methyl, ethyl, propyl, butyl, pentyl, hexyl, heptyl, octyl, nonyl, decyl, dimethylpentyl, tert-butyl, isopropyl, or isomers thereof, such as $R^3$, $R^4$, and $R^5$ are hydrogen.

In at least one embodiment, at least one of $R^6$, $R^7$, $R^{11}$, or $R^{12}$ is independently halogen, —$CF_3$, —$OR^{16}$, —$NR^{17}{}_2$, or —$SiR^{18}{}_3$, such as at least one of the $R^6$, $R^7$, $R^{11}$, or $R^{12}$ is halogen, or at least one of the $R^6$, $R^7$, $R^{11}$, or $R^{12}$ is not methyl. For example, at least one of $R^6$, $R^7$, $R^{11}$, or $R^{12}$ is independently selected from fluorine, chlorine, bromine, or iodine. In at least one embodiment, $R^6$, $R^7$, $R^{11}$, and $R^{12}$ are independently selected from methyl, ethyl, tert-butyl, F, Br, Cl, and I. In at least one embodiment, at least one of $R^6$, $R^7$, $R^{11}$, or $R^{12}$ is Cl. $R^6$, $R^7$, $R^{11}$, or $R^{12}$ can be independently hydrogen, $C_1$-$C_{22}$ alkyl, $C_2$-$C_{22}$ alkenyl, $C_6$-$C_{22}$ aryl, arylalkyl where alkyl can have from 1 to 10 carbon atoms and aryl can have from 6 to 20 carbon atoms, or —$SiR^{19}{}_3$, wherein $R^6$, $R^7$, $R^{11}$, $R^{12}$ can be independently substituted by halogen, —$OR^{16}$, —$NR^{17}{}_2$,—or $SiR^{18}{}_3$; wherein $R^6$ optionally bonds with $R^8$, $R^8$ optionally bonds with $R^9$, $R^9$ optionally bonds with $R^{10}$, $R^{10}$ optionally bonds with $R^7$, $R^{11}$ optionally bonds with $R^{13}$, $R^{13}$ optionally bonds with $R^{14}$, $R^{14}$ optionally bonds with $R^{15}$, and $R^{15}$ optionally bonds with $R^{12}$, in each case to independently form a five-, six-, or seven-membered ring.

In at least one embodiment, the catalyst compound represented by Formula (I) has an electron withdrawing side. Each of $R^{11}$, $R^{12}$, $R^{13}$, $R^{14}$, and $R^{15}$ can be independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, —$OR^{16}$, —$NR^{17}{}_2$, or —$SiR^{18}{}_3$, halogen, —$NO_2$, or five-, six-, or seven-membered heterocyclic ring including at least one atom selected from N, P, O, and S. $R^{11}$, $R^{12}$, $R^{13}$, $R^{14}$, and $R^{15}$ can be independently substituted by —$NO_2$, —$CF_3$, —$CF_2CF_3$, —$CH_2CF_3$, halogen, —$OR^{16}$, —$NR^{17}{}_2$, or —$SiR^{18}{}_3$. Furthermore, each of $R^1$, $R^{12}$, $R^{13}$, $R^{14}$, and $R^{15}$ can be independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or alkylaryl where alkyl has from 1 to 10 carbon atoms and aryl has from 6 to 20 carbon atoms, where at least one of R, $R^{12}$, $R^{13}$, $R^{14}$, and $R^{15}$ can be substituted by —$NO_2$, —$CF_3$, —$CF_2CF_3$, —$CH_2CF_3$, halogen, —$OR^{16}$, —$NR^{17}{}_2$, or —$SiR^{18}{}_3$. In at least one embodiment, at least one of R, $R^{12}$, $R^{13}$, $R^{14}$, and $R^{15}$ is halogen or $C_1$-$C_{22}$-alkyl substituted with one or more halogen atoms. In at least one embodiment, each of R, $R^{12}$, $R^{13}$, $R^{14}$, and $R^{15}$ is independently hydrogen, halogen (such as fluorine, chlorine, bromine, or iodine), or trihalomethyl (such as trichloromethyl or trifluoromethyl), where at least one of R, $R^{12}$, $R^{13}$, $R^{14}$, and $R^{15}$ is halogen or trihalomethyl.

Each of $R^6$, $R^7$, $R^8$, $R^9$, $R^{10}$, $R^{11}$, $R^{12}$, $R^{13}$, $R^{14}$, and $R^{15}$ can be independently selected from hydrogen, methyl, ethyl, propyl, butyl, pentyl, hexyl, heptyl, octyl, nonyl, decyl, undecyl, dodecyl, phenyl, substituted phenyl, biphenyl or an isomer thereof, which may be halogenated (such as perfluoropropyl, perfluorobutyl, perfluoroethyl, perfluoromethyl), substituted hydrocarbyl radicals and all isomers of substituted hydrocarbyl radicals including trimethylsilylpropyl, trimethylsilylmethyl, trimethylsilylethyl, phenyl, or all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, or dipropylmethylphenyl, or isomers thereof.

In at least one embodiment, each of $E^1$, $E^2$, and $E^3$ is independently carbon, nitrogen or phosphorus, such as each of $u^1$, $u^2$, and $u^3$ is independently 0 if $E^1$, $E^2$, or $E^3$ is nitrogen or phosphorus, and each of $u^1$, $u^2$, and $u^3$ is independently 1 if $E^1$, $E^2$, or $E^3$ is carbon. Each of $R^3$, $R^4$, and $R^5$ can be independently hydrogen or $C_1$-$C_{22}$-alkyl. In at least one embodiment, E, $E^2$, and $E^3$ are carbon, and each of $R^3$, $R^4$, and $R^5$ is hydrogen. In another embodiment, $R^1$ and $R^2$ are methyl, and $R^3$, $R^4$, and $R^5$ are hydrogen.

In at least one embodiment, each instance of $X^1$ and $X^2$ is independently substituted hydrocarbyl, and the radicals $X_1$ and $X_2$ can be bonded with one another. For example, r can be 1 or 2, such as r can be 1. In another example, s can be 1 or 2, such as s can be 1. In at least one embodiment, r and s are the same. For example, each instance of $X^1$ and $X^2$ can be any suitable silane, such as (trialkylsilyl)$C_1$-$C_{20}$ alkyl-, such as (trialkylsilyl)$C_1$-$C_{10}$ alkyl-, such as (trialkylsilyl)$C_1$-$C_5$ alkyl-. In at least one embodiment, one or more $X^1$ and $X^2$ is independently selected from (trimethylsilyl)methyl-, (trimethylsilyl)methyl-, (trimethylsilyl)ethyl-, (trimethylsilyl)propyl-, (trimethylsilyl)butyl-, (trimethylsilyl)pentyl-, (trimethylsilyl)hexyl-, (trimethylsilyl)heptyl-, (trimethylsilyl)octyl-, (trimethylsilyl)nonyl-, (trimethylsilyl)decyl-, (triethylsilyl)methyl-, (triethylsilyl)methyl-, (triethylsilyl)ethyl-, (triethylsilyl)propyl-, (triethylsilyl)butyl-, (triethylsilyl)pentyl-, (triethylsilyl)hexyl-, (triethylsilyl)heptyl-, (triethylsilyl)octyl-, (triethylsilyl)nonyl-, (triethylsilyl)decyl-, (triisopropylsilyl)methyl-, (triisopropylsilyl)methyl-, (triisopropylsilyl)ethyl-, (triisopropylsilyl)propyl-, (triisopropylsilyl)butyl-, (triisopropylsilyl)pentyl-, (triisopropylsilyl)hexyl-, (triisopropylsilyl)heptyl-, (triisopropylsilyl)octyl-, (triisopropylsilyl)nonyl-, (triisopropylsilyl)decyl-, (t-BuPh$_2$Si)methyl-, (t-BuPh$_2$Si)methyl-, (t-BuPh$_2$Si)ethyl-, (t-BuPh$_2$Si)propyl-, (t-BuPh$_2$Si)butyl-, (t-BuPh$_2$Si)pentyl-, (triethylsilyl)hexyl-, (t-BuPh$_2$Si)heptyl-, (t-BuPh$_2$Si)octyl-, (t-BuPh$_2$Si)nonyl-, (t-BuPh$_2$Si)decyl-, or isomers thereof. For example, $X^1$ and $X^2$ can be (trimethylsilyl)methyl-.

In at least one embodiment, the catalyst compound represented by Formula (I) is one or more of:

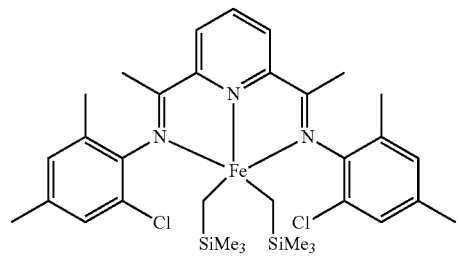

1

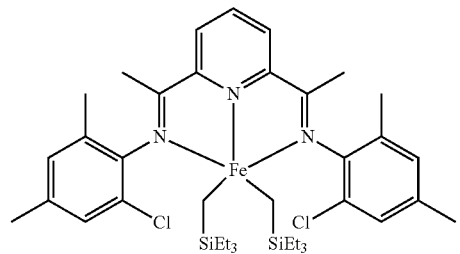

2

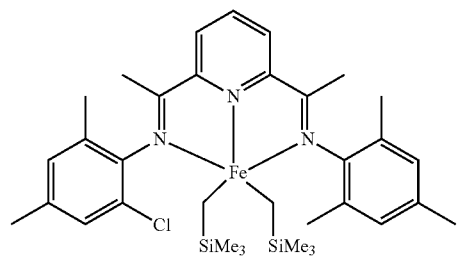

3

-continued
4
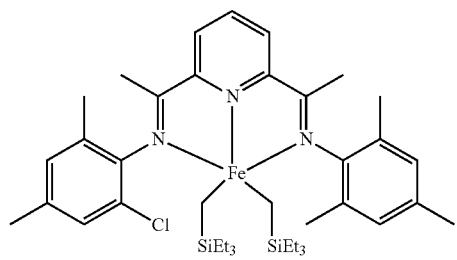
5
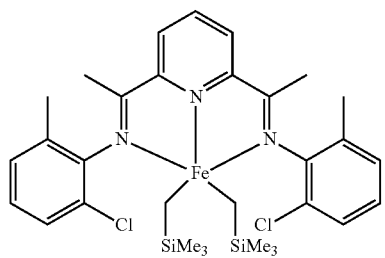
6
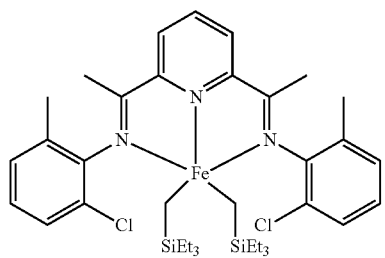
7
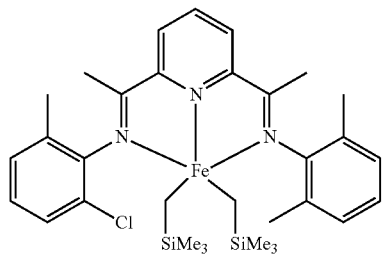
8
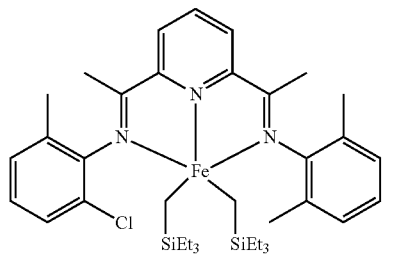
9
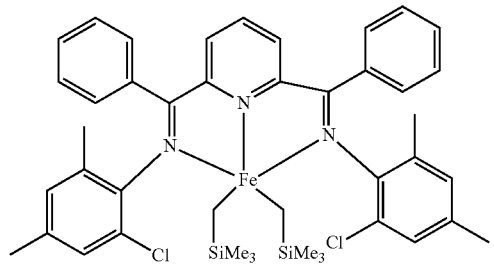
-continued
10
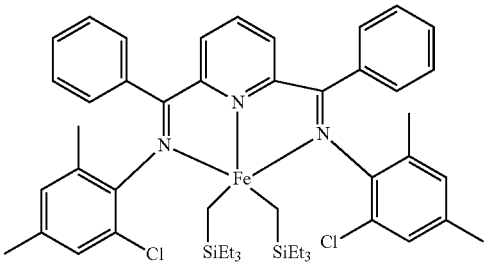
11
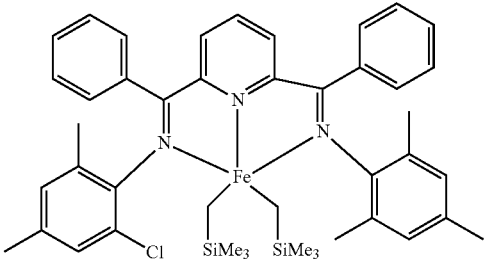
12
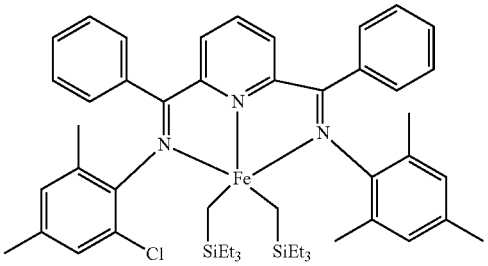
13
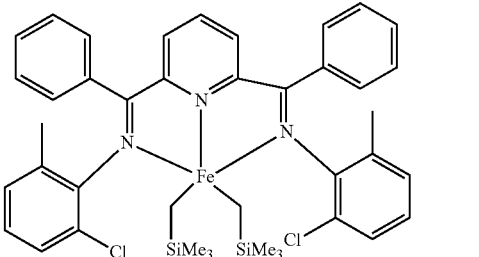
14
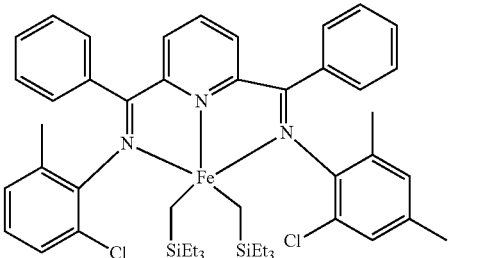
15
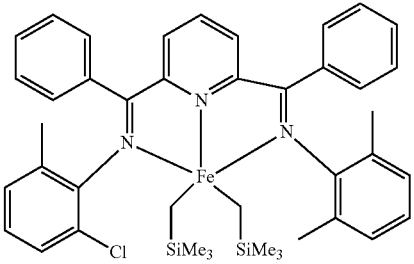

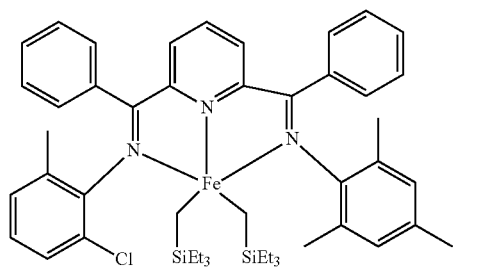
16
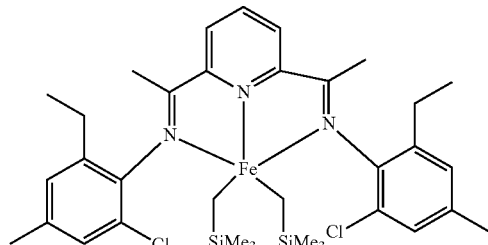
17
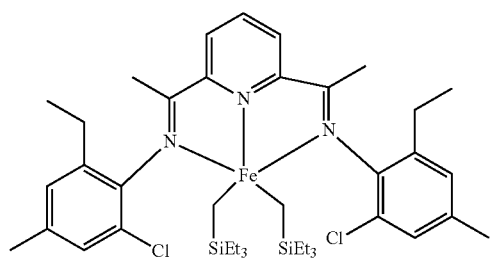
18
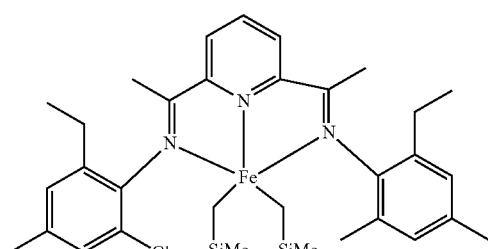
19
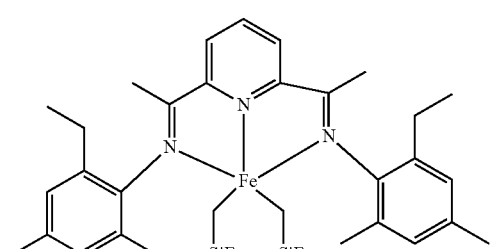
20
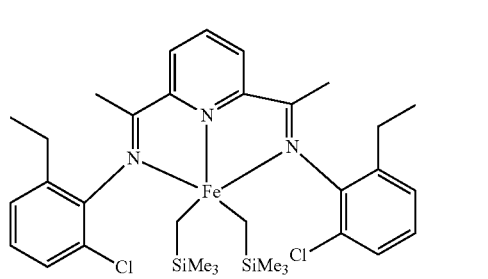
21
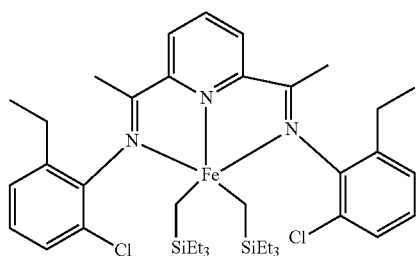
22
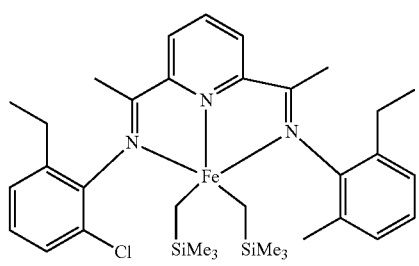
23
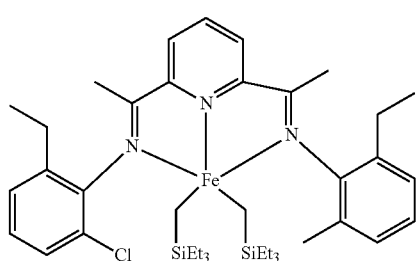
24
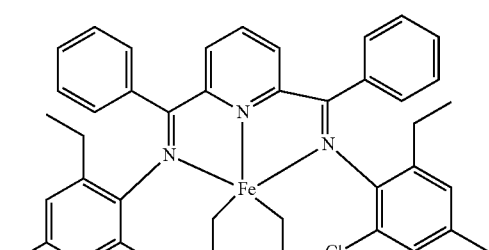
25
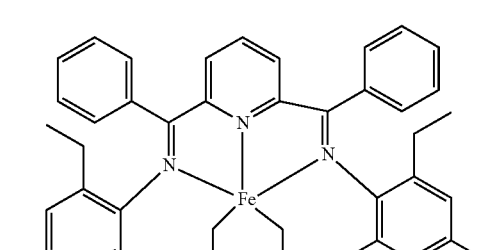
26
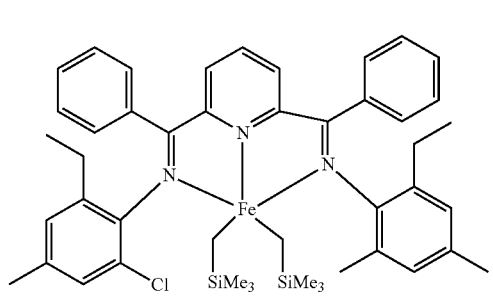
27

28
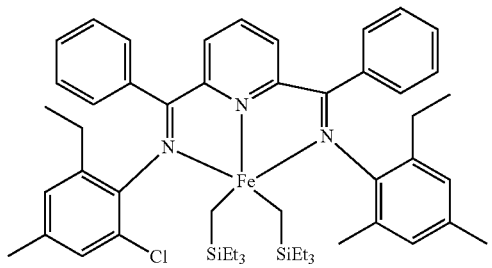
29
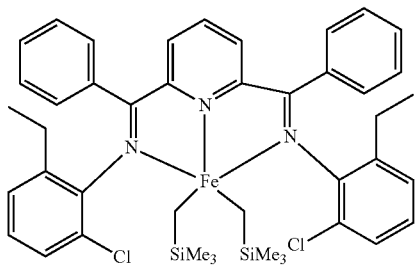
30
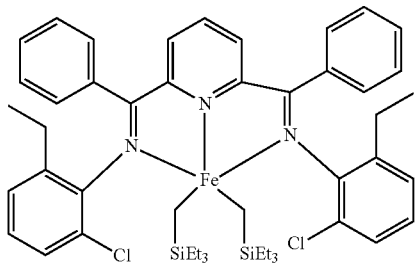
31
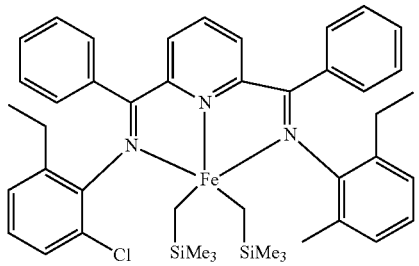
32
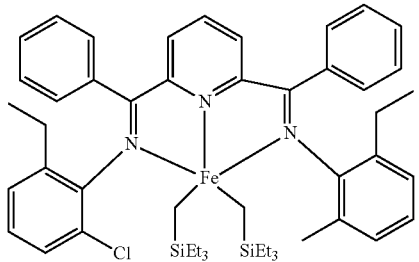
33
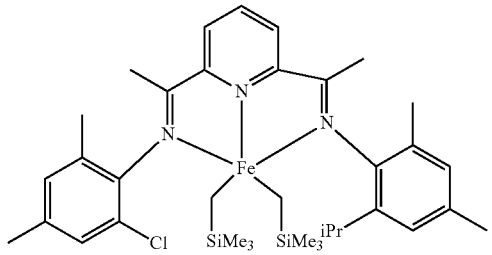
34
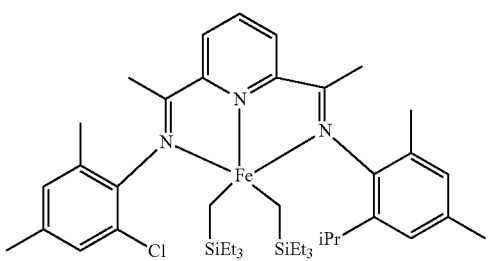
35
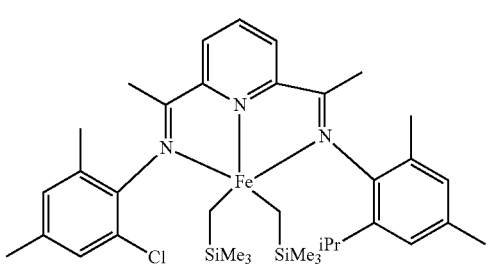
36
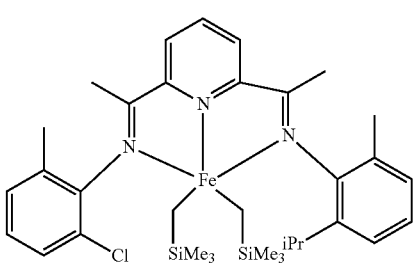
37
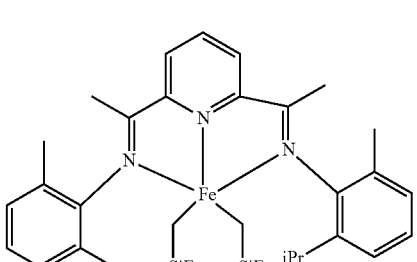
38
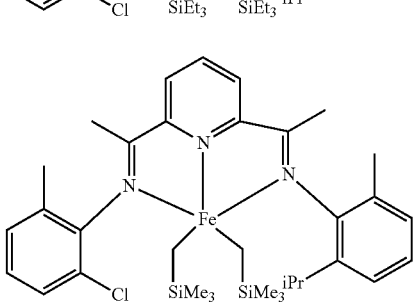

40
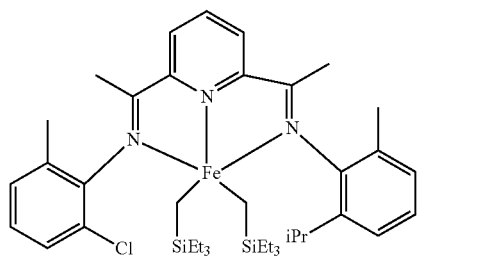
41
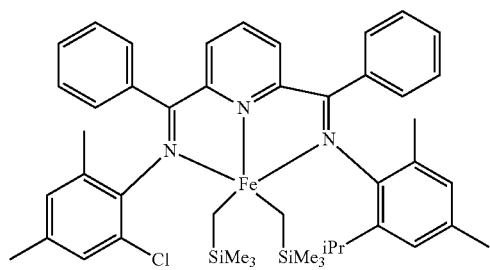
42
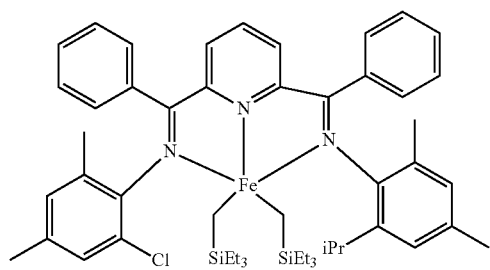
43
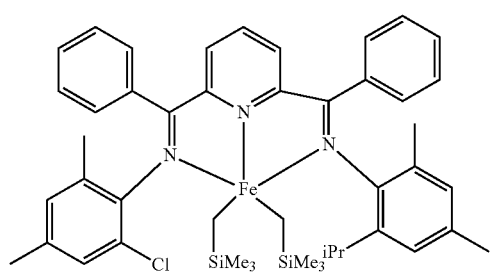
44
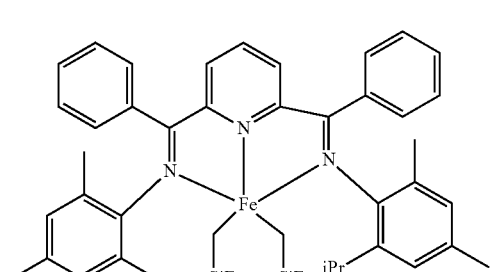
45
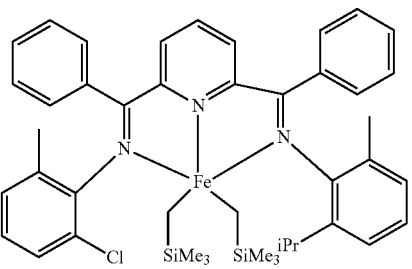
46
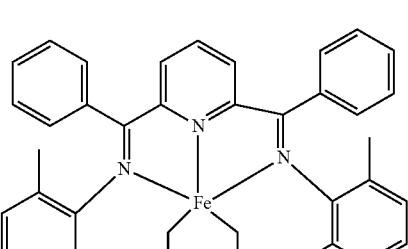
47
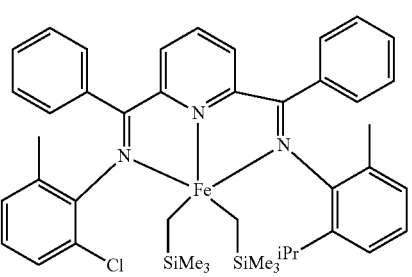
48
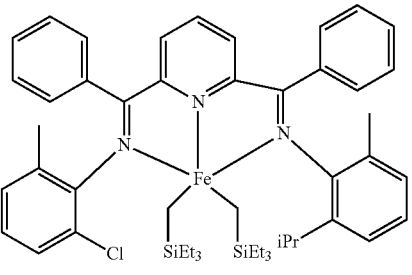
In at least one embodiment, the catalyst compound represented by Formula (I) is selected from:
1
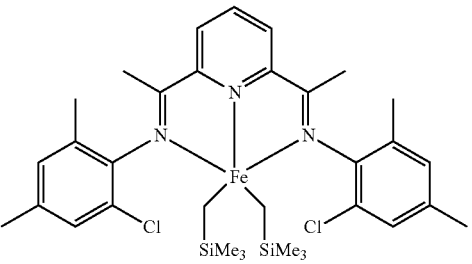

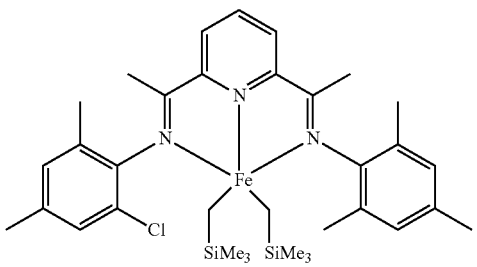

In at least one embodiment, two or more different catalyst compounds are present in a catalyst system. In at least one embodiment, two or more different catalyst compounds are present in the reaction zone where the process(es) described herein occur. When two transition metal compound based catalysts are used in one reactor as a mixed catalyst system, the two transition metal compounds can be chosen such that the two are compatible. A simple screening method such as by $^1H$ or $^{13}C$ NMR, known to those of ordinary skill in the art, can be used to determine which transition metal compounds are compatible. The same activator can be used for the transition metal compounds, however, two different activators, such as a non-coordinating anion activator and an alumoxane, can be used in combination. If one or more transition metal compounds contain an $X^1$ or $X^2$ ligand which is not a hydride, hydrocarbyl, or substituted hydrocarbyl, then the alumoxane should be contacted with the transition metal compounds prior to addition of the non-coordinating anion activator.

In at least one embodiment, one or more different catalyst compounds are present in a catalyst system. One or more different catalyst compounds can be present in the reaction zone where the process(es) described herein occur. The same activator can be used for the transition metal compounds, however, two different activators, such as a non-coordinating anion activator and an alumoxane, can be used in combination.

The two transition metal compounds (pre-catalysts) may be used in any ratio. Molar ratios of (A) transition metal compound to (B) transition metal compound can be (A:B) of from 1:1000 to 1000:1, alternatively 1:100 to 500:1, alternatively 1:10 to 200:1, alternatively 1:1 to 100:1, alternatively 1:1 to 75:1, and alternatively 5:1 to 50:1. The suitable ratio chosen will depend on the exact pre-catalysts chosen, the method of activation, and the end product desired. In at least one embodiment, when using the two pre-catalysts, where both are activated with the same activator, mole percentages, based upon the molecular weight of the pre-catalysts, can be from 10% to 99.9% A to 0.1% to 90% B, alternatively 25% to 99% A to 0.5% to 75% B, alternatively 50% to 99% A to 1% to 50% B, and alternatively 75% to 99% A to 1% to 10% B.

Methods to Prepare the Catalyst Compounds.

The following is a generic description to prepare a catalyst compound described herein and further exemplified in the examples. All air sensitive syntheses can be carried out in nitrogen purged dry boxes. All solvents are available from commercial sources. Substituted anilines; substituted pyridines; Grignard reagents; iron (II) chloride; and formic acid may be available from commercial sources. To a mixture of a diacetyl aryl ((e.g., 2,6-diacetylpyridine) and a polar protic solvent (e.g., MeOH), can be added an aniline (e.g., 2-chloro-4,6-dimethylaniline) and an acid (e.g., formic acid). The resulting compound can then be treated with iron(II) chloride to form an iron-chelated compound, which can be further treated with a substituted hydrocarbyl Grignard reagent, such as a silyl-containing alkylating reagent (e.g., $Me_3SiCH_2MgCl$), in order to form the iron bis(imino) aryl catalyst compound represented by Formula (I) including the substituted hydrocarbyl moiety described above.

Additionally or alternatively, synthesis of ligands, such as 1,1'-(pyridine-2,6-diyl)(N-(2-chloro-4,6-dimethylphenyl) ethan-1-imine)(N-(2,4,6-trimethylphenyl)ethan-1-imine), can be made using procedure described in WO2007/080081.

Activators

The terms "cocatalyst" and "activator" are used herein interchangeably.

The catalyst systems described herein may comprise a catalyst complex as described above and an activator such as alumoxane or a non-coordinating anion and may be formed by combining the catalyst components described herein with activators in any manner known from the literature including combining them with supports, such as silica. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, may include alumoxanes, aluminum alkyls, ionizing activators, which may be neutral or ionic, and conventional-type cocatalysts. Suitable activators may include alumoxane compounds, modified alumoxane compounds, and ionizing anion precursor compounds that abstract a reactive, 6-bound, metal ligand making the metal compound cationic and providing a charge-balancing non-coordinating or weakly coordinating anion, e.g., a non-coordinating anion.

In at least one embodiment, the catalyst system includes an activator and the catalyst compound of Formula (I).

Alumoxane Activators

Alumoxane activators are utilized as activators in the catalyst systems described herein. Alumoxanes are generally oligomeric compounds containing —Al($R^{a'''}$)—O— subunits, where $R^{a'''}$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, such as when the abstractable ligand is an alkyl, halide, alkoxide or amide. Mixtures of different alumoxanes and modified alumoxanes may also be used. It may be suitable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584, which is incorporated by reference herein). Another useful alumoxane is solid polymethylaluminoxane as described in U.S. Pat. Nos. 9,340,630; 8,404,880; and 8,975,209 which are incorporated by reference herein.

When the activator is an alumoxane (modified or unmodified), in at least one embodiment, select the maximum amount of activator at up to a 5,000-fold molar excess Al/M over the catalyst compound (per metal catalytic site). The minimum activator-to-catalyst-compound can be a 1:1 molar ratio. Alternate ranges may include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. For example, alumoxane can be present at zero mol %, alternately the alumoxane can be present at a molar ratio of aluminum to catalyst compound transition metal less than 500:1, such as less than 300:1, such as less than 100:1, such as less than 1:1.

Ionizing/Non-Coordinating Anion Activators

The term "non-coordinating anion" (NCA) means an anion which either does not coordinate to a cation or which is only weakly coordinated to a cation thereby remaining sufficiently labile to be displaced by a Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization. Suitable ionizing activators may include an NCA, such as a compatible NCA.

It is within the scope of the present disclosure to use an ionizing activator, neutral or ionic. It is also within the scope of the present disclosure to use neutral or ionic activators alone or in combination with alumoxane or modified alumoxane activators. For descriptions of suitable activators please see U.S. Pat. Nos. 8,658,556 and 6,211,105.

The catalyst systems of the present disclosure can include at least one non-coordinating anion (NCA) activator. In at least one embodiment, boron containing NCA activators represented by the formula below can be used:

where:

Z is (L-H) or a reducible Lewis acid; L is a Lewis base; H is hydrogen;

(L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand transition metal catalyst precursor, resulting in a cationic transition metal species.

The activating cation $Z_d^+$ may also be a moiety such as silver, tropylium, carbeniums, ferroceniums and mixtures, such as carbeniums and ferroceniums. $Z_d^+$ can be triphenyl carbenium. Reducible Lewis acids can be a triaryl carbenium (where the aryl can be substituted or unsubstituted, such as those represented by the formula: ($Ar_3C^+$), where Ar is aryl or aryl substituted with a heteroatom, a $C_1$ to $C_{40}$ hydrocarbyl, or a substituted $C_1$ to $C_{40}$ hydrocarbyl), such as the reducible Lewis acids "Z" may include those represented by the formula: ($Ph_3C$), where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbenium.

When $Z_d^+$ is the activating cation $(L-H)_d^+$, it can be a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ where k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Each Q can be a fluorinated hydrocarbyl group having 1 to 20 carbon atoms, such as each Q is a fluorinated aryl group, and such as each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as activators in U.S. Pat. No. 8,658,556, which is incorporated by reference herein.

The ionic stoichiometric activator $Z_d+(A^{d-})$ can be one or more of N,N-dimethylanilinium tetrakis(perfluorophenyl)borate, N,N-dimethylanilinium tetrakis(perfluoronaphthyl)borate, dioctadecylmethylammonium tetrakis(perfluorophenyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

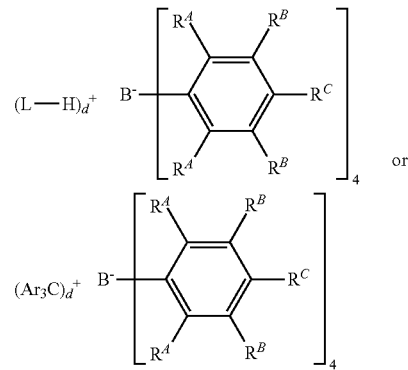

where:

each $R^A$ is independently a halide, such as a fluoride;

Ar is substituted or unsubstituted aryl group (such as a substituted or unsubstituted phenyl), such as substituted with $C_1$ to $C_{40}$ hydrocarbyls, such as $C_1$ to $C_{20}$ alkyls or aromatics;

each $R^B$ is independently a halide, a $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^B$ is a fluoride or a perfluorinated phenyl group);

each $R^c$ is a halide, $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^D$ is a fluoride or a $C_6$ perfluorinated aromatic hydrocarbyl group); where $R^B$ and $R^c$ can form one or more saturated or unsaturated, substituted or unsubstituted rings (such as $R^B$ and $R^c$ form a perfluorinated phenyl ring);

L is a Lewis base; $(L-H)^+$ is a Bronsted acid; d is 1, 2, or 3;

where the anion has a molecular weight of greater than 1,020 g/mol; and where at least three of the substituents on the B atom each have a molecular volume of greater than 250 cubic Å, alternately greater than 300 cubic Å, or alternately greater than 500 cubic Å.

For example, $(Ar_3C)_d^+$ can be $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_2$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," *Journal of Chemical Education*, v. 71(11), November 1994, pp. 962-964, which is incorporated by reference herein. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of suitable bulky activators please see U.S. Pat. No. 8,658,556, which is incorporated by reference herein.

In another embodiment, one or more of the NCA activators is chosen from the activators described in U.S. Pat. No. 6,211,105.

In a at least one embodiment, the activator is selected from one or more of a triaryl carbenium (such as triphenylcarbenium tetraphenylborate, triphenylcarbenium tetrakis(pentafluorophenyl)borate, triphenylcarbeniumtetrakis-(2,3,4,6-tetrafluorophenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate).

In another embodiment, the activator is selected from one or more of trialkylammonium tetrakis(pentafluorophenyl) borate, N,N-dialkylanilinium tetrakis(pentafluorophenyl) borate, dioctadecylmethylammonium tetrakis(pentafluorophenyl)borate, dioctadecylmethylammonium tetrakis (perfluoronaphthyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl) borate, trialkylammonium tetrakis(perfluorobiphenyl) borate, N,N-dialkylanilinium tetrakis(perfluorobiphenyl) borate, trialkylammonium tetrakis(3,5-bis(trifluoromethyl) phenyl)borate, N,N-dialkylanilinium tetrakis(3,5-bis (trifluoromethyl)phenyl)borate, N,N-dialkyl-(2,4,6-trimethylanilinium) tetrakis(3,5-bis(trifluoromethyl)phenyl) borate, di-(i-propyl)ammonium tetrakis(pentafluorophenyl) borate, (where alkyl is methyl, ethyl, propyl, n-butyl, sec-butyl, or t-butyl).

Suitable activator-to-catalyst ratio, e.g., all NCA activators to catalyst ratio may be about a 1:1 molar ratio. Alternate ranges include from 0.1:1 to 100:1, alternately from 0.5:1 to 200:1, alternately from 1:1 to 500:1, alternately from 1:1 to 1000:1. Suitable ranges can be from 0.5:1 to 10:1, such as 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 which discuss the use of an alumoxane in combination with an ionizing activator).

Useful chain transfer agents can be hydrogen, alkylalumoxanes, a compound represented by the formula $AlR_3$, $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Furthermore, a catalyst system of the present disclosure may include a metal hydrocarbenyl chain transfer agent represented by the formula:

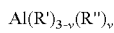

where each R' can be independently a $C_1$-$C_{30}$ hydrocarbyl group, and or each $R^{11}$, can be independently a $C_4$-$C_{20}$ hydrocarbenyl group having an end-vinyl group; and v can be from 0.1 to 3.

Optional Scavengers or Coactivators

In addition to these activator compounds, scavengers or coactivators may be used. Aluminum alkyl or alumoxane compounds which may be utilized as scavengers or coactivators may include, for example, trimethylaluminum, triethylaluminum, triisobutylaluminum, tri-n-hexylaluminum, tri-n-octylaluminum, diisobutylaluminum hydride, methylalumoxane (MAO), modified methylalumoxane (MMAO), MMAO-3A, and diethyl zinc.

Optional Support Materials

In embodiments herein, the catalyst system may include an inert support material. The supported material can be a porous support material, for example, talc, and inorganic oxides. Other support materials include zeolites, clays, organoclays, or another organic or inorganic support material, or mixtures thereof.

The support material can be an inorganic oxide in a finely divided form. Suitable inorganic oxide materials for use in catalyst systems herein may include groups 2, 4, 13, and 14 metal oxides, such as silica, alumina, and mixtures thereof. Other inorganic oxides that may be employed either alone or in combination with the silica, or alumina can be magnesia, titania, zirconia. Other suitable support materials, however, can be employed, for example, finely divided functionalized polyolefins, such as finely divided polyethylene. Examples of suitable supports may include magnesia, titania, zirconia, montmorillonite, phyllosilicate, zeolites, talc, clays. Also, combinations of these support materials may be used, for example, silica-chromium, silica-alumina, silica-titania. In at least one embodiment, the support material is selected from $Al_2O_3$, $ZrO_2$, $SiO_2$, $SiO_2/Al_2O_3$, $SiO_2/TiO_2$, silica clay, silicon oxide/clay, or mixtures thereof.

The support material, such as an inorganic oxide, can have a surface area of from about 10 $m^2/g$ to about 700 $m^2/g$, pore volume of from about 0.1 $cm^3/g$ to about 4.0 $cm^3/g$ and average particle size of from about 5 μm to about 500 μm. The surface area of the support material can be of from about 50 $m^2/g$ to about 500 $m^2/g$, pore volume of from about 0.5 $cm^3/g$ to about 3.5 $cm^3/g$ and average particle size of from about 10 μm to about 200 μm. For example, the surface area of the support material can be from about 100 $m^2/g$ to about 400 $m^2/g$, pore volume from about 0.8 $cm^3/g$ to about 3.0 $cm^3/g$ and average particle size can be from about 5 μm to about 100 μm. The average pore size of the support material useful in the present disclosure can be of from 10 Å to 1000 Å, such as 50 Å to about 500 Å, and such as 75 Å to about 350 Å. In at least one embodiment, the support material is a high surface area, amorphous silica (surface area=300 $m^2/gm$; pore volume of 1.65 $cm^3/gm$). For example, suitable silicas can be the silicas marketed under the tradenames of DAVISON™ 952 or DAVISON™ 955 by the Davison Chemical Division of W.R. Grace and Company. In other embodiments, DAVISON™ 948 is used. Alternatively, a silica can be ES-70™ silica (PQ Corporation, Malvern, Pa.) that has been calcined, for example (such as at 875° C.).

The support material should be dry, that is, free of absorbed water. Drying of the support material can be effected by heating or calcining at about 100° C. to about 1,000° C., such as at least about 600° C. When the support material is silica, it is heated to at least 200° C., such as about 200° C. to about 850° C., and such as at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of the present disclosure. The calcined support material is then contacted with at least one polymerization catalyst including at least one catalyst compound and an activator.

The support material, having reactive surface groups, such as hydroxyl groups, is slurried in a non-polar solvent and the resulting slurry is contacted with a solution of a catalyst compound and an activator. In at least one embodiment, the slurry of the support material is first contacted with the activator for a period of time of from about 0.5 hour to about 24 hours, from about 2 hours to about 16 hours, or from about 4 hours to about 8 hours. The solution of the catalyst compound is then contacted with the isolated support/activator. In at least one embodiment, the supported catalyst system is generated in situ. In alternate embodiment, the slurry of the support material is first contacted with the catalyst compound for a period of time of from about 0.5 hour to about 24 hours, from about 2 hours to about 16 hours, or from about 4 hours to about 8 hours. The slurry of the supported catalyst compound is then contacted with the activator solution.

The mixture of the catalyst, activator and support is heated from about 0° C. to about 70° C., such as from about 23° C. to about 60° C., such as at room temperature. Contact times can be from about 0.5 hours to about 24 hours, such as from about 2 hours to about 16 hours, or from about 4 hours to about 8 hours.

Suitable non-polar solvents are materials in which all of the reactants used herein, e.g., the activator and the catalyst compound, are at least partially soluble and which are liquid at reaction temperatures. Non-polar solvents can be alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In at least one embodiment, the support material is a supported methylalumoxane (SMAO), which is an MAO activator treated with silica (e.g., ES-70-875 silica).

Polymerization Processes

The present disclosure relates to polymerization processes where monomer (e.g., ethylene; propylene), and optionally comonomer, are contacted with a catalyst system including an activator and at least one catalyst compound, as described above. The catalyst compound and activator may be combined in any order. The catalyst compound and activator may be combined prior to contacting with the monomer. Alternatively the catalyst compound and activator may be introduced into the polymerization reactor separately, wherein they subsequently react to form the active catalyst.

Monomers may include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer includes ethylene and an optional comonomer including one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and or one or more functional groups. In another embodiment, the monomer includes propylene and an optional comonomer including one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and or one or more functional groups.

Exemplary $C_2$ to $C_{40}$ olefin monomers and optional comonomers may include ethylene, propylene, butene, pentene, hexene, heptene, octene, nonene, decene, undecene, dodecene, norbornene, ethylidenenorbornene, vinylnorbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be used. A bulk homogeneous process can be used. Alternately, no solvent or diluent is present or added in the reaction medium, (except for the small amounts used as the carrier for the catalyst system or other additives, or amounts found with the monomer; e.g., propane in propylene). In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization may include non-coordinating, inert liquids. Examples of diluents/solvents for polymerization may include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents may also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. In at least one embodiment, the polymerization is run in a bulk process.

Polymerizations can be run at any temperature and or pressure suitable to obtain the desired polymers. Suitable temperatures and or pressures include a temperature of from about 0° C. to about 300° C., such as about 20° C. to about 200° C., such as about 35° C. to about 160° C., such as from about 80° C. to about 160° C., such as from about 85° C. to about 140° C. Polymerizations can be run at a pressure of from about 0.1 MPa to about 25 MPa, such as from about 0.45 MPa to about 6 MPa, or from about 0.5 MPa to about 4 MPa.

In a suitable polymerization, the run time of the reaction can be up to 300 minutes, such as from about 5 minutes to 250 minutes, such as from about 10 minutes to 120 minutes, such as from about 20 minutes to 90 minutes, such as from about 30 minutes to 60 minutes. In a continuous process the run time may be the average residence time of the reactor. In at least one embodiment, the run time of the reaction is up to 45 minutes. In a continuous process the run time may be the average residence time of the reactor.

In at least one embodiment, hydrogen is present in the polymerization reactor at a partial pressure of 0.001 psig to 50 psig (0.007 kPa to 345 kPa), such as from 0.01 psig to 25 psig (0.07 kPa to 172 kPa), such as from 0.1 psig to 10 psig (0.7 kPa to 70 kPa).

In at least one embodiment, the hydrogen content is from about 0.0001 ppm to about 2,000 ppm, such as from about 0.0001 ppm to about 1,500 ppm, such as from about 0.0001 ppm to about 1,000 ppm, such as from about 0.0001 ppm to about 500 ppm. Alternately, hydrogen can be present at zero ppm.

In at least one embodiment, little or no alumoxane is used in the process to produce the polymers. For example, alumoxane can be present at zero mol %, alternately the alumoxane can be present at a molar ratio of aluminum to transition metal less than 500:1, such as less than 300:1, such as less than 100:1, such as less than 1:1.

In at least one embodiment, the polymerization: 1) is conducted at temperatures of 0° C. to 300° C. (such as 25° C. to 250° C., such as 50° C. to 160° C., such as 80° C. to 140° C.); 2) is conducted at a pressure of atmospheric pressure to 10 MPa (such as 0.35 MPa to 10 MPa, such as from 0.45 MPa to 6 MPa, such as from 0.5 MPa to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics are present in the solvent at less than 1 wt %, such as less than 0.5 wt %, such as at 0 wt % based upon the weight of the solvents); 4) wherein the catalyst system used in the polymerization comprises less than 0.5 mol %, such as 0 mol % alumoxane, alternately the alumoxane is present at a molar ratio of aluminum to transition metal less than 500:1, such as less than 300:1, such as less than 100:1, such as less than 1:1; 5) the polymerization occurs in one reaction zone; 6) optionally scavengers (such as trialkyl aluminum compounds) are absent (e.g., present at zero mol %, alternately the scavenger is present at a molar ratio of scavenger metal to transition metal of less than 100:1, such as less than 50:1, such as less than 15:1, such as less than 10:1); and 7) optionally hydrogen is present in the polymerization reactor at a partial pressure of 0.001 psig to 50 psig (0.007 kPa to 345 kPa) (such as from 0.01 psig to 25 psig (0.07 kPa to 172 kPa), such as 0.1 psig to 10 psig (0.7 kPa to 70 kPa)). In at least one embodiment, the catalyst system used in the polymerization includes no more than one catalyst compound. A "reaction zone" also referred to as a "polymerization zone" is a vessel where polymerization takes place, for example a stirred-tank reactor or a loop reactor. When multiple reactors are used in a continuous polymerization process, each reactor is considered as a separate polymerization zone. For a multi-stage polymerization in a batch polymerization process, each polymerization stage is considered as a separate polymerization zone. In at least one embodiment, the polymerization occurs in one reaction zone. Room temperature is 23° C. unless otherwise noted.

Other additives may also be used in the polymerization, as desired, such as one or more scavengers, hydrogen, aluminum alkyls, or chain transfer agents (such as alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof).

Solution Polymerization

A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are not turbid as described in Oliveira, J. V. et al. (2000) *Ind. Eng, Chem. Res.* v. 29, pg. 4627. Solution polymerization may involve polymerization in a continuous reactor in which the polymer formed, the starting monomer and catalyst materials supplied are agitated to reduce or avoid concentration gradients and in which the monomer acts as a diluent or solvent or in which a hydrocarbon is used as a diluent or solvent. Suitable processes can operate at temperatures from about 0° C. to about 250° C., such as from about 50° C. to about 170° C., such as from about 80° C. to about 150° C., and or at pressures of about 0.1 MPa or more, such as 0.5 MPa or more. The upper pressure limit is not critically constrained but can be about 200 MPa or less, such as 120 MPa or less, such as 30 MPa or less. Temperature control in the reactor can be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

A process described herein can be a solution polymerization process that may be performed in a batchwise fashion (e.g., batch; semi-batch) or in a continuous process. Suitable reactors may include tank, loop, and tube designs. In at least one embodiment, the process is performed in a continuous fashion and dual loop reactors in a series configuration are used. In at least one embodiment, the process is performed in a continuous fashion and dual continuous stirred-tank reactors (CSTRs) in a series configuration are used. Furthermore, the process can be performed in a continuous fashion and a tube reactor can be used. In another embodiment, the process is performed in a continuous fashion and one loop reactor and one CSTR are used in a series configuration. The process can also be performed in a batchwise fashion and a single stirred tank reactor can be used.

Polyolefin Products

The present disclosure relates to compositions of matter produced by the methods described herein.

In at least one embodiment, a process described herein produces $C_2$ to $C_{20}$ olefin homopolymers (e.g., polyethylene; polypropylene), or $C_2$ to $C_{20}$ olefin copolymers (e.g., ethylene-octene, ethylene-propylene) and or propylene-alpha-olefin copolymers, such as $C_3$ to $C_{20}$ copolymers (such as propylene-hexene copolymers or propylene-octene copolymers).

In at least one embodiment, a polymer of the present disclosure has an Mw from about 10,000 g/mol to about 500,000 g/mol, such as from about 15,000 g/mol to about 450,000 g/mol, such as from about 20,000 g/mol to about 400,000 g/mol, such as from about 25,000 g/mol to about 350,000 g/mol, such as from about 30,000 g/mol to about 300,000 g/mol.

In at least one embodiment, a polymer of the present disclosure has an Mn from about 1,000 g/mol to about 300,000 g/mol, such as from about 2,500 g/mol to about 200,000 g/mol, such as from about 5,000 g/mol to about 100,000 g/mol, such as from about 7,500 g/mol to about 75,000 g/mol, such as from about 9,000 g/mol to about 50,000 g/mol.

In at least one embodiment, a polymer of the present disclosure has an Mz from about 10,000 g/mol to about 500,000 g/mol, such as from about 15,000 g/mol to about 450,000 g/mol, such as from about 20,000 g/mol to about 400,000 g/mol, such as from about 25,000 g/mol to about 350,000 g/mol, such as from about 30,000 g/mol to about 300,000 g/mol. Alternatively, a polymer of the present disclosure can have an Mz greater than 500,000 g/mol, such as from about 600,000 g/mol to about 3,000,000 g/mol, such as from about 700,000 g/mol to about 2,500,000 g/mol, such as from about 800,000 g/mol to about 2,000,000 g/mol, such as from about 900,000 g/mol to about 1,500,000 g/mol.

In at least one embodiment, a polymer of the present disclosure has an Mw/Mn (PDI) value from about 1 to about 8, such as from about 2 to about 7, such as from about 3 to about 6.5, such as from about 3.5 to about 6, alternatively from about 1.5 to about 2.5.

Furthermore, a polymer of the present disclosure can have a Tm (° C.) of from about 120° C. to about 150° C., such as from about 122.5° C. to about 145° C., from about 125° C. to about 140° C., such as from about 130° C. to about 135° C.

Likewise, a process of the present disclosure produces olefin polymers, such as polyethylene and polypropylene homopolymers and copolymers. In at least one embodiment, the polymers produced herein are homopolymers of ethylene or copolymers of ethylene having, for example, from about 0.00001 wt % to about 8 wt % (alternately from about 0.00001 wt % to about 7 wt %, such as from about 0.05 wt % to about 5 wt %, such as from about 0.5 wt % to about 2.5 wt %), of one or more $C_3$ to $C_{20}$ olefin comonomer (such as $C_3$ to $C_{12}$ alpha-olefin, such as propylene, butene, hexene, octene, decene, dodecene, such as propylene, butene, hexene, octene). In further embodiment, the polymers produced herein are homopolymers of ethylene or copolymers of ethylene having, for example, from about 0.05 wt % to about 25 wt % (alternately from about 0.5 wt % to about 20 wt %, alternately from about 1 wt % to about 15 wt %, such as from about 1 wt % to about 10 wt %, such as from about 3 wt % to about 10 wt %) of one or more $C_3$ to $C_{20}$ olefin comonomer (such as $C_3$ to $C_{12}$ alpha-olefin, such as propylene, butene, hexene, octene, decene, dodecene, such as propylene, butene, hexene, octene). In at least one embodiment, the monomer is ethylene and the comonomer is hexene, such as from about 0.00001 wt % to about 5 wt % hexene, such as from about 0.00001 wt % to about 4 wt % hexene, such as from about 0.00001 wt % to about 2.5 wt % hexene, based on the weight of the polymer.

In at least one embodiment, the polymers produced herein are homopolymers of propylene or are copolymers of propylene having, for example, from about 0.00001 wt % to about 8 wt % (alternately from about 0.00001 wt % to about 7 wt %, such as from about 0.05 wt % to about 5 wt %, such as from about 0.5 wt % to about 2.5 wt %) of one or more of $C_2$ or $C_4$ to $C_{20}$ olefin comonomer (such as ethylene or $C_4$ to $C_{12}$ alpha-olefin, such as ethylene, butene, hexene, octene, decene, dodecene, such as ethylene, butene, hexene, octene). In at least one embodiment, the monomer is propylene and the comonomer is hexene, such as from about 0.00001 wt % to about 5 wt % hexene, such as from about 0.00001 wt % to about 4 wt % hexene, such as from about 0.00001 wt % to about 2.5 wt % hexene, based on the weight of the polymer.

In at least one embodiment, the polymers produced herein have an Mw of about 10,000 g/mol to about 500,000 g/mol, an Mn from about 1,000 g/mol to about 300,000 g/mol, an Mz from about 10,000 g/mol to about 1,500,000 g/mol, and or an Mw/Mn (PDI) of about 1 to 6.

In at least one embodiment, a polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

GPC 4-D

For purposes of the claims, and unless otherwise indicated, the distribution and the moments of molecular weight (Mw, Mn, Mz, Mw/Mn, etc.), the comonomer content and the branching index (g') are determined by using a high temperature Gel Permeation Chromatography (Polymer Char GPC-IR) equipped with a multiple-channel band-filter based Infrared detector IR5 with a multiple-channel band filter based infrared detector ensemble IR5 with band region covering from about 2,700 cm$^{-1}$ to about 3,000 cm$^{-1}$ (representing saturated C—H stretching vibration), an 18-angle light scattering detector and a viscometer. Three Agilent PLgel 10-μm Mixed-B LS columns are used to provide polymer separation. Reagent grade 1,2,4-trichlorobenzene (TCB) (from Sigma-Aldrich) including ~300 ppm antioxidant BHT can be used as the mobile phase at a nominal flow rate of ~1.0 mL/min and a nominal injection volume of ~200 μL. The whole system including transfer lines, columns, and detectors can be contained in an oven maintained at ~145° C. A given amount of sample can be weighed and sealed in a standard vial with ~10 L flow marker (heptane) added thereto. After loading the vial in the auto-sampler, the oligomer or polymer may automatically be dissolved in the instrument with ~8 mL added TCB solvent at ~160° C. with continuous shaking. The sample solution concentration can be from ~0.2 to ~2.0 mg/ml, with lower concentrations used for higher molecular weight samples. The concentration, c, at each point in the chromatogram can be calculated from the baseline-subtracted IR5 broadband signal, I, using the equation: c=αI, where α is the mass constant determined with polyethylene or polypropylene standards. The mass recovery can be calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha + 1} + \frac{\alpha_{PS} + 1}{\alpha + 1} \log M_{PS}$$

where the variables with subscript "PS" stand for polystyrene while those without a subscript are for the test samples. In this method, $\alpha_{PS}$=0.67 and $K_{PS}$=0.000175, a and K for other materials are as calculated and published in literature (Sun, T. et al. (2001) Macromolecules, v. 34, pg. 6812), except that for purposes of this present disclosure and claims thereto, {α=0.695+(0.01*(wt. fraction propylene)) and K=0.000579−(0.0003502*(wt. fraction propylene)) for ethylene-propylene copolymers and ethylene-propylene-diene terpolymers,}, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+ 0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000TC) as a function of molecular weight. The short-chain branch (SCB) content per 1,000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$w2 = f*SCB/1000TC.$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}$$

then the same calibration of the $CH_3$ and $CH_2$ signal ratio, as mentioned previously in obtaining the $CH_3$/1000TC as a function of molecular weight, is applied to obtain the bulk $CH_3$/1000TC. A bulk methyl chain ends per 1000TC (bulk $CH_3$end/1000TC) is obtained by weight-averaging the chain-end correction over the molecular-weight range. Then $w2b = f*\text{bulk } CH3/1000TC$ bulk SCB/1000TC=bulk CH3/1000TC −bulk CH3end/1000TC and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1-0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and a are for the reference linear polymer, which are, for purposes of this present disclosure and claims thereto, [$\alpha$=0.695+(0.01*(wt. fraction propylene)) and K=0.000579−(0.0003502*(wt. fraction propylene)) for ethylene-propylene copolymers and ethylene-propylene-diene terpolymers], $\alpha$=0.695 and K=0.000579 for linear ethylene polymers, $\alpha$=0.705 and K=0.0002288 for linear propylene polymers, $\alpha$=0.695 and K=0.000181 for linear butene polymers, $\alpha$ is 0.695 and K is 0.000579*(1−0.0087*w2b+ 0.000018*(w2b)^2) for ethylene-butene copolymer where w2b is a bulk weight percent of butene comonomer, $\alpha$ is 0.695 and K is 0.000579*(1−0.0075*w2b) for ethylene-hexene copolymer where w2b is a bulk weight percent of hexene comonomer, and $\alpha$ is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

Blends

In another embodiment, the polymer (such as the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and or butene, and or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and or polyisobutylene.

In at least one embodiment, the polymer (such as the polyethylene or polypropylene) is present in the above blends, at from 10 wt % to 99 wt %, based upon the weight of the polymers in the blend, such as 20 wt % to 95 wt %, such as at least 30 wt % to 90 wt %, such as at least 40 wt % to 90 wt %, such as at least 50 wt % to 90 wt %, such as at least 60 wt % to 90 wt %, such as at least 70 to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and or in a product formed from the blend, such as a film, as desired. Such additives are well known in the art, and can include, for example: fillers;

antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc.

Films

Any of the foregoing polymers, such as the foregoing polypropylenes or blends thereof, may be used in a variety of end-use applications. Such applications include, for example, mono- or multi-layer blown, extruded, and or shrink films. These films may be formed by any number of well known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and or longitudinal directions to the same or different extents. The uniaxially orientation can be accomplished using suitable cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. For example, the films can be oriented in the Machine Direction (MD) at a ratio of up to 15, such as from about 5 to about 7, and in the Transverse Direction (TD) at a ratio of up to 15, such as from about 7 to about 9. However, in another embodiment the film is oriented to the same extent in both the MD and TD directions.

The films may vary in thickness depending on the intended application; however, films of a thickness from 1 µm to 50 µm can be suitable. Films intended for packaging can be from 10 µm to 50 µm thick. The thickness of the sealing layer can be from 0.2 µm to 50 µm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In at least one embodiment, one or both of the surface layers is modified by corona treatment.

Embodiments Listing

The present disclosure provides, among others, the following embodiments, each of which may be considered as optionally including any alternate embodiments.

Clause 1. A catalyst compound represented by Formula (I):

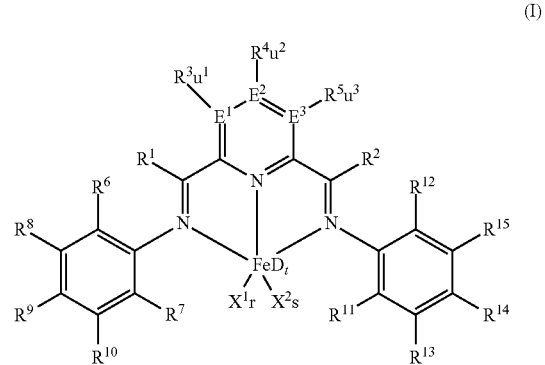

wherein:
each of $R^1$ and $R^2$ is independently hydrogen, $C_1$-$C_{22}$ alkyl, $C_2$-$C_{22}$ alkenyl, $C_6$-$C_{22}$ aryl, arylalkyl wherein alkyl has from 1 carbon atom to 10 carbon atoms and aryl has from 6 carbon atoms to 20 carbon atoms, or five-, or six-, or seven-membered heterocyclic ring comprising at least one atom selected from the group consisting of N, P, O and S; wherein each of $R^1$ and $R^2$ is optionally substituted by halogen, —$OR^{16}$, —$NR^{17}_2$, or —$SiR^{18}_3$; wherein $R^1$ optionally bonds with $R^3$, and $R^2$ optionally bonds with $R^5$, in each case to independently form a five-, six-, or seven-membered ring;

each of $R^3$, $R^4$, $R^5$, $R^8$, $R^9$, $R^{10}$, $R^{13}$, $R^{14}$, and $R^{15}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, —$OR^{16}$, —$NR^{17}_2$, halogen, —$SiR^{18}_3$ or five-, six- or seven-membered heterocyclic ring comprising at least one atom selected from the group consisting of N, P, O and S;

wherein $R^3$, $R^4$, $R^5$, $R^8$, $R^9$, $R^{10}$, $R^{13}$, $R^{14}$, and $R^{15}$ are optionally substituted by halogen, —$OR^{16}$, —$NR^{17}_2$, or —$SiR^{18}_3$; wherein $R^3$ optionally bonds with $R^4$, $R^4$ optionally bonds with $R^5$, $R^7$ optionally bonds with $R^{10}$, $R^{10}$ optionally bonds with $R^9$, $R^9$ optionally bonds with $R^8$, $R^8$ optionally bonds with $R^6$, $R^{15}$ optionally bonds with $R^{14}$, $R^{14}$ optionally bonds with $R^{13}$, and $R^{13}$ optionally bonds with $R^{11}$, in each case to independently form a five-, six- or seven-membered carbocyclic or heterocyclic ring, the heterocyclic ring comprising at least one atom from the group consisting of N, P, O and S;

each of $R^6$, $R^7$, $R^{11}$, and $R^{12}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, a heteroatom or a heteroatom-containing group, or five-, six- or seven-membered heterocyclic ring comprising at least one atom selected from the group consisting of N, P, O and S; wherein $R^6$, $R^7$, $R^{11}$, and $R^{12}$ are optionally substituted by halogen, —$OR^{16}$, —$NR^{17}_2$, or —$SiR^{18}_3$, wherein $R^6$ optionally bonds with $R^8$, $R^{11}$ optionally bonds with $R^{13}$, or $R^{15}$ optionally bonds with $R^{12}$ in each case to independently form a five-, six- or seven-membered carbocyclic or heterocyclic ring, the heterocyclic ring comprising at least one atom from the group consisting of N, P, O and S; wherein at least one of $R^6$, $R^7$, $R^{11}$, and $R^{12}$ is independently a heteroatom or a heteroatom-containing group, or at least one of the $R^6$, $R^7$, $R^{11}$, and $R^{12}$ is not methyl, or if $R^{11}$ is H and $R^{12}$ is iPr, then at least one of $R^6$ and $R^7$ is not methyl;

each of $R^{16}$, $R^{17}$, and $R^{18}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or —SiR$^{19}_3$, wherein each R$^{16}$, R$^{17}$, and R$^{18}$ is independently optionally substituted by halogen, or two R$^{16}$ radicals optionally bond to form a five- or six-membered ring, or two R$^{17}$ radicals optionally bond to form a five- or six-membered ring, or two R$^{18}$ radicals optionally bond to form a five- or six-membered ring;

each R$^{19}$ is independently hydrogen, C$_1$-C$_{22}$ alkyl, C$_2$-C$_{22}$ alkenyl, C$_6$-C$_{22}$ aryl, arylalkyl where alkyl has from 1 to 10 carbon atoms and aryl has from 6 to 20 carbon atoms, or two R$^{19}$ radicals optionally bond to form a five- or six-membered ring;

each of E$^1$, E$^2$, and E$^3$ is independently carbon, nitrogen or phosphorus;

each of u$^1$, u$^2$, and u$^3$ is independently 0 if E$^1$, E$^2$, or E$^3$ is nitrogen or phosphorus, and each of u$^1$, u$^2$, and u$^3$ is independently 1 if E$^1$, E$^2$, or E$^3$ is carbon;

each of X$^1$ and X$^2$ is independently substituted hydrocarbyl, and the radicals X can be bonded with one another;

r is 1 or 2;

s is 1 or 2;

D is a neutral donor; and t is 0 to 2.

Clause 2. The catalyst compound of clause 1, wherein each of E$^1$, E$^2$, and E$^3$ is carbon, and each of u$^1$, u$^2$, and u$^3$ is 1.

Clause 3. The catalyst compound of clauses 1 or 2, wherein R$^3$, R$^4$, and R$^5$ is hydrogen.

Clause 4. The catalyst compound of any of clauses 1 to 3, wherein each of X$^1$ and X$^2$ is a substituted hydrocarbyl.

Clause 5. The catalyst compound of any of clauses 1 to 4, wherein one or more X$^1$ and X$^2$ is independently selected from (trimethylsilyl)methyl-, (trimethylsilyl)methyl-, (trimethylsilyl)ethyl-, (trimethylsilyl)propyl-, (trimethylsilyl)butyl-, (trimethylsilyl)pentyl-, (trimethylsilyl)hexyl-, (trimethylsilyl)heptyl-, (trimethylsilyl)octyl-, (trimethylsilyl)nonyl-, (trimethylsilyl)decyl-, (triethylsilyl)methyl-, (triethylsilyl)methyl-, (triethylsilyl)ethyl-, (triethylsilyl)propyl-, (triethylsilyl)butyl-, (triethylsilyl)pentyl-, (triethylsilyl)hexyl-, (triethylsilyl)heptyl-, (triethylsilyl)octyl-, (triethylsilyl)nonyl-, (triethylsilyl)decyl-, (triisopropylsilyl)methyl-, (triisopropylsilyl)methyl-, (triisopropylsilyl)ethyl-, (triisopropylsilyl)propyl-, (triisopropylsilyl)butyl-, (triisopropylsilyl)pentyl-, (triisopropylsilyl)hexyl-, (triisopropylsilyl)heptyl-, (triisopropylsilyl)octyl-, (triisopropylsilyl)nonyl-, (triisopropylsilyl)decyl-, (t-BuPh$_2$Si)methyl-, (t-BuPh$_2$Si)methyl-, (t-BuPh$_2$Si)ethyl-, (t-BuPh$_2$Si)propyl-, (t-BuPh$_2$Si)butyl-, (t-BuPh$_2$Si)pentyl-, (triethylsilyl)hexyl-, (t-BuPh$_2$Si)heptyl-, (t-BuPh$_2$Si)octyl-, (t-BuPh$_2$Si)nonyl-, (t-BuPh$_2$Si)decyl-, or isomers thereof.

Clause 6. The catalyst compound of any of clauses 1 to 5, wherein X$^1$ and X$^2$ are (trimethylsilyl)methyl-.

Clause 7. The catalyst compound of any of clauses 1 to 6, wherein r is 1 and s is 1. Clause 8. The catalyst compound of any of clauses 1 to 7, wherein t is 0.

Clause 9. The catalyst compound of any of clauses 1 to 8, wherein at least one of R$^6$ or R$^7$ is independently fluorine, chlorine, bromine, or iodine.

Clause 10. The catalyst compound of any of clauses 1 to 9, wherein R$^6$ is methyl and R$^7$ is chlorine.

Clause 11. The catalyst compound of any of clauses 1 to 10, wherein R$^8$, R$^9$, and R$^{10}$ are hydrogen.

Clause 12. The catalyst compound of any of clauses 1 to 11, wherein R$^{11}$ is methyl and R$^{12}$ is methyl.

Clause 13. The catalyst compound of any of clauses 1 to 11, wherein R$^{11}$ is chlorine and R$^{12}$ is methyl.

Clause 14. The catalyst compound of any of clauses 1 to 11, wherein R$^6$, R$^7$, R$^{11}$, and R$^{12}$ are independently selected from methyl, ethyl, tert-butyl, F, Br, Cl, and I.

Clause 15. The catalyst compound of any of clauses 1 to 11, wherein R$^6$, R$^7$, R$^{11}$, and R$^{12}$ are independently selected from ethyl, propyl, butyl, pentyl, hexyl, heptyl, octyl, nonyl, decyl, undecyl, dodecyl, phenyl, substituted phenyl, biphenyl or an isomer thereof, substituted hydrocarbyl radicals and all isomers of substituted hydrocarbyl radicals comprising trimethylsilylpropyl, trimethylsilylmethyl, trimethylsilylethyl, phenyl, or all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, or dipropylmethylphenyl, or isomers thereof.

Clause 16. The catalyst compound of any clauses 1 to 15, wherein each of R$^1$ and R$^2$ is independently C$_1$-C$_{22}$ alkyl or C$_6$-C$_{22}$ aryl.

Clause 17. The catalyst compound of any of clauses 1 to 16, wherein each of R$^1$ and R$^2$ is C$_1$-C$_{22}$ alkyl.

Clause 18. The catalyst compound of any of clauses 1 to 17, wherein R$^1$ is methyl and R$^2$ is methyl.

Clause 19. The catalyst compound of cause 1, wherein the catalyst compound is selected from:

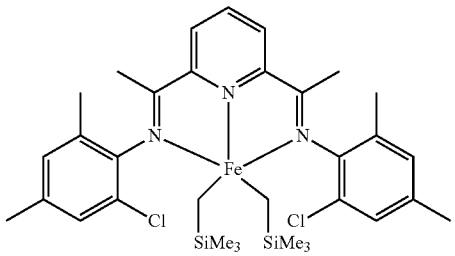

1

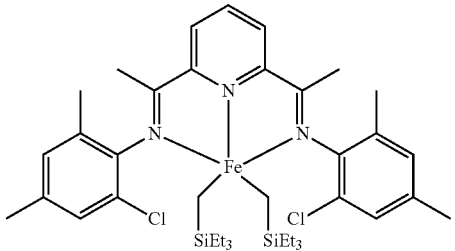

2

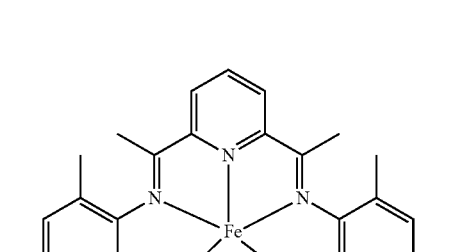

3

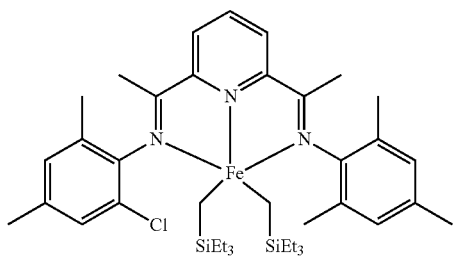
4
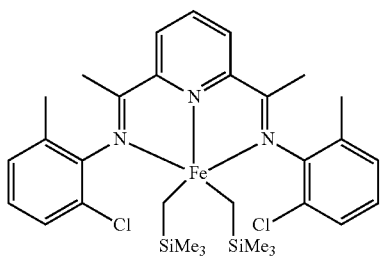
5
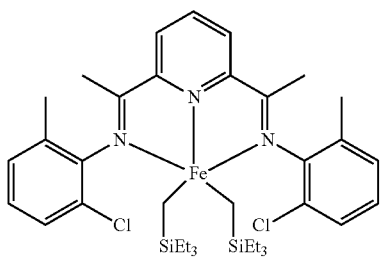
6
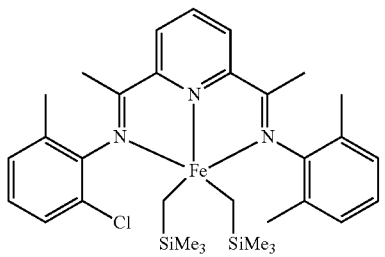
7
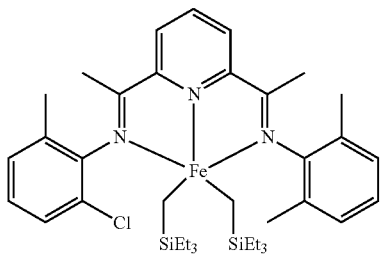
8
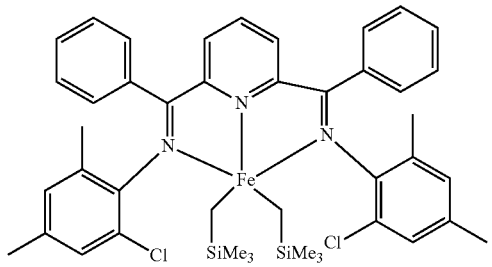
9
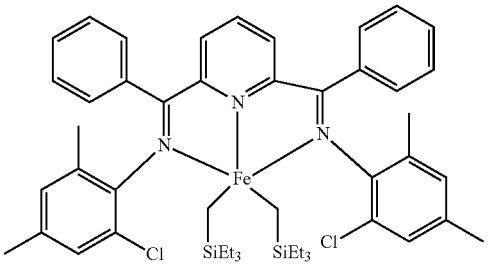
10
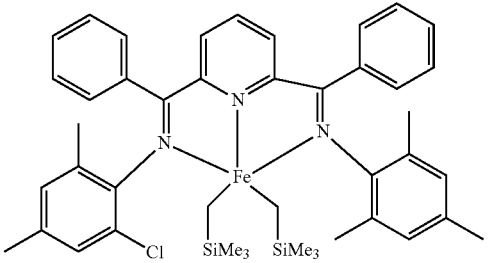
11
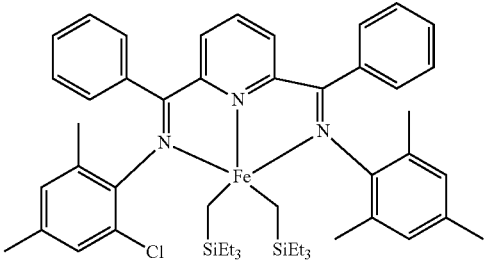
12
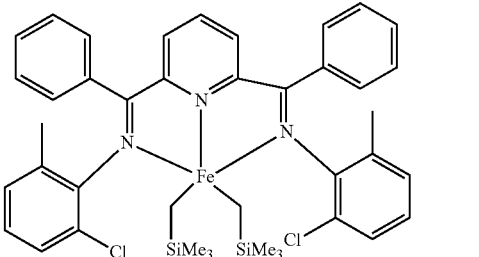
13
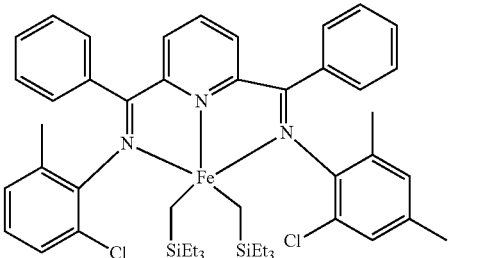
14
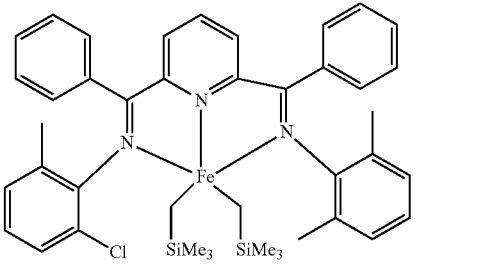
15

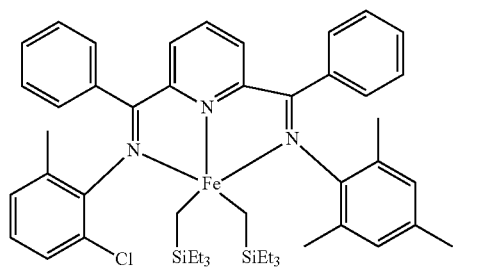
16
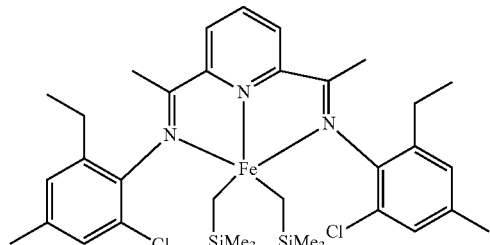
17
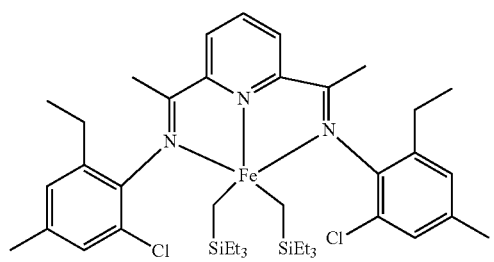
18
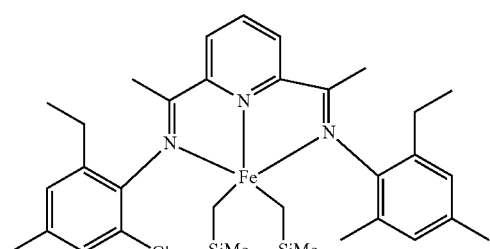
19
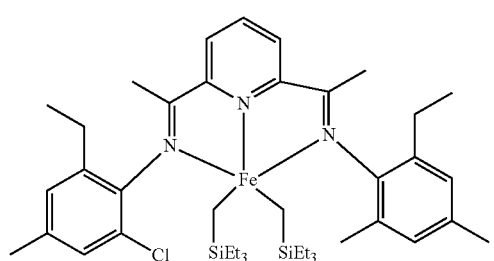
20
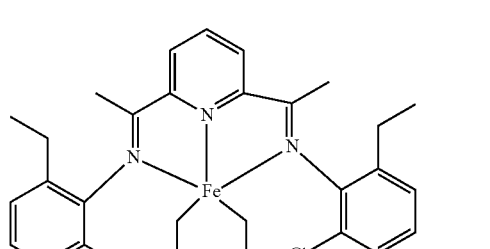
21
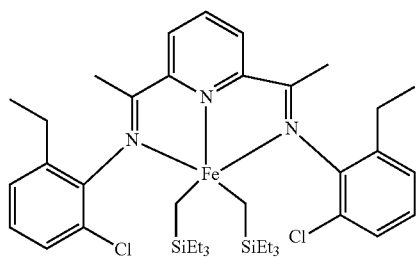
22
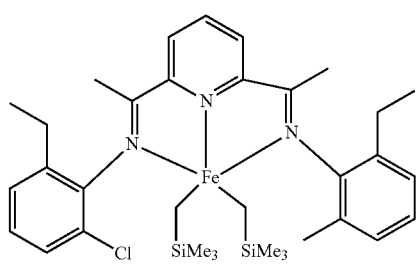
23
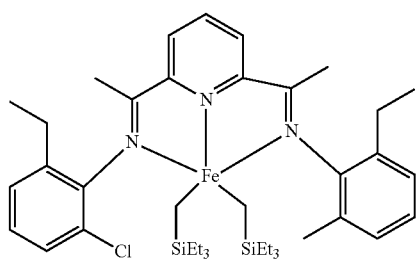
24
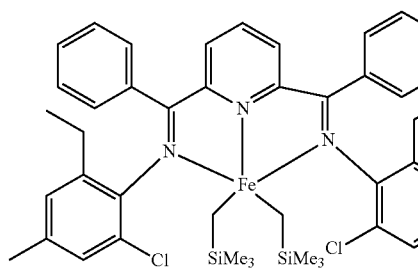
25
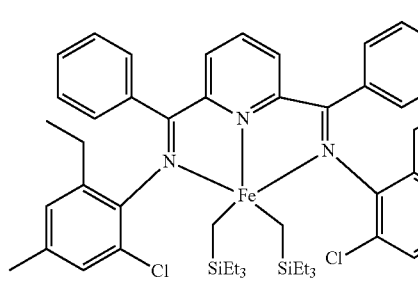
26
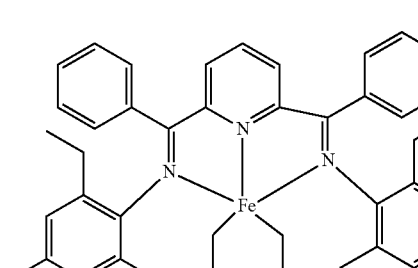
27

28
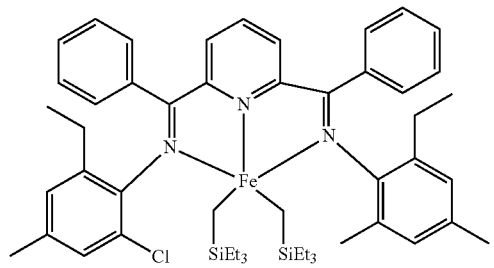
29
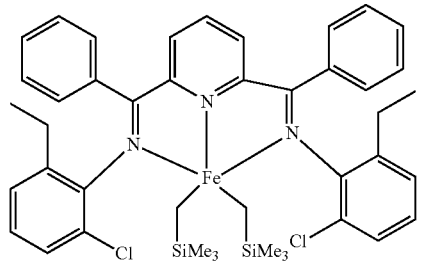
30
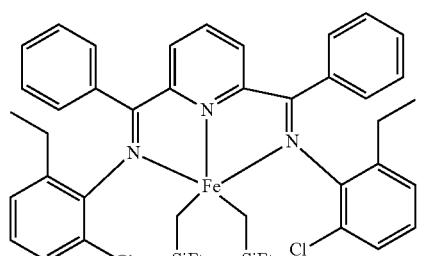
31
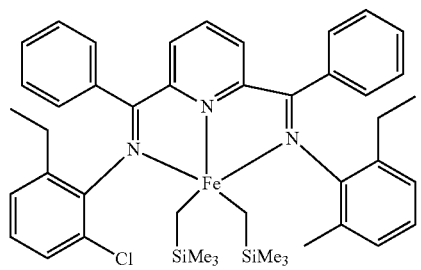
32
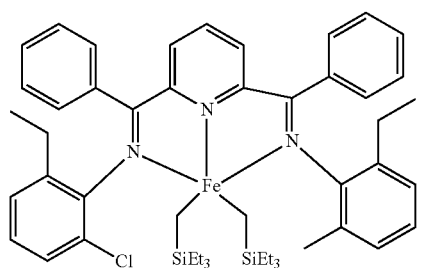
33
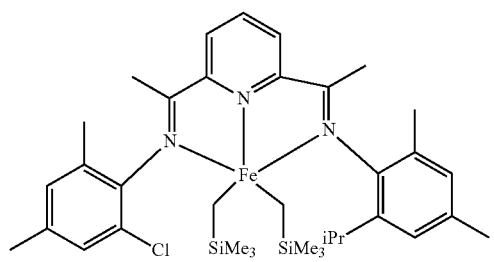
34
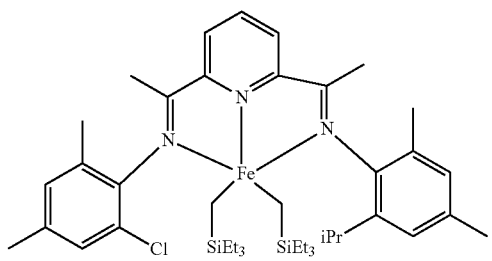
35
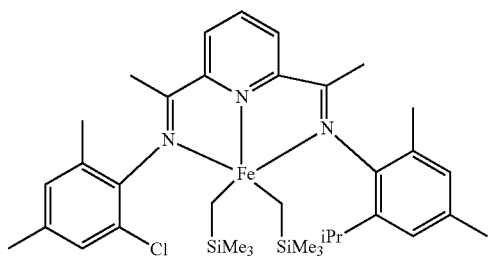
36
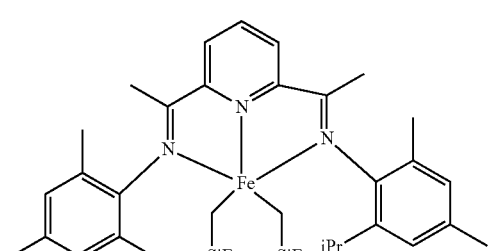
37
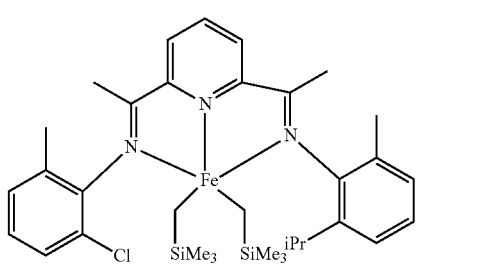
38
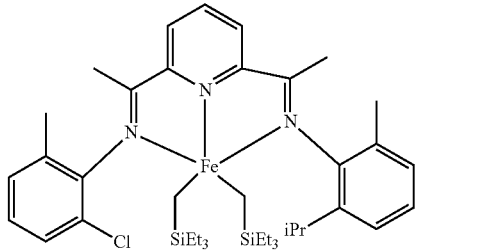
39
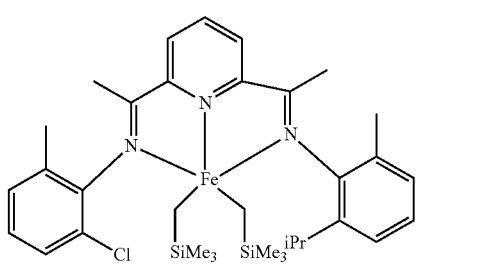

40
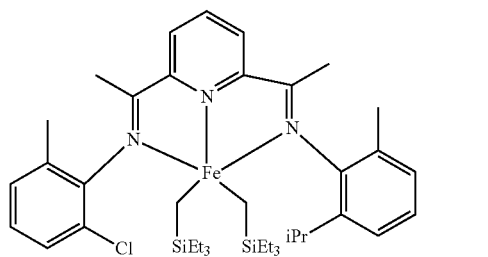
41
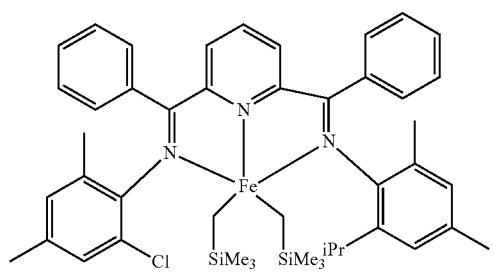
42
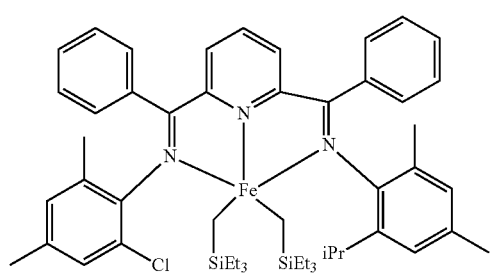
43
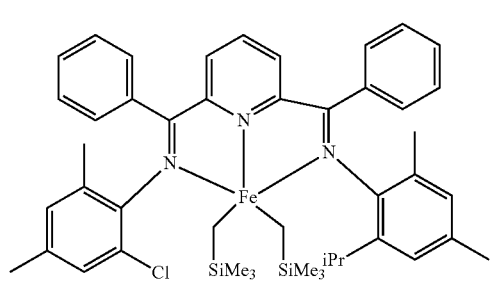
44
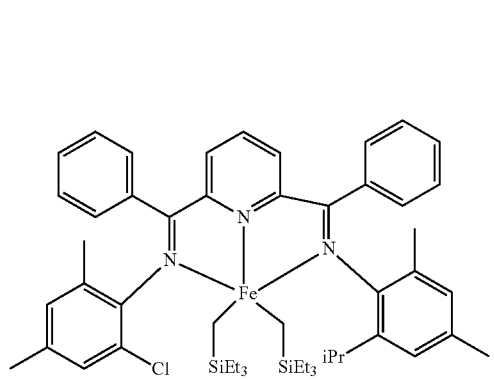
45
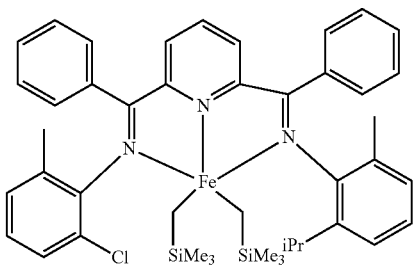
46
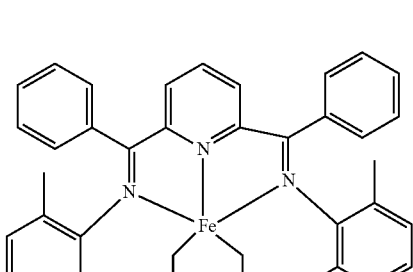
47
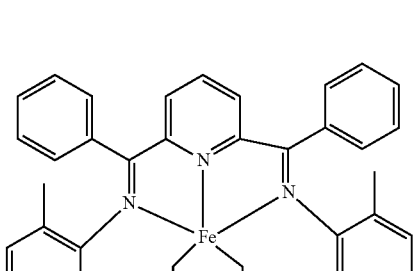
48
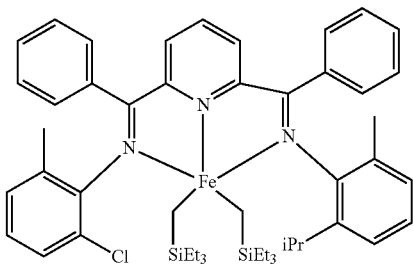
Clause 20. The catalyst compound of clause 1, wherein the catalyst compound is selected from:
1
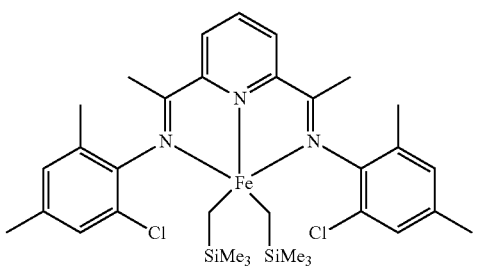

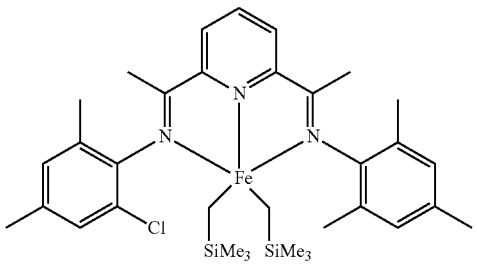

Clause 21. A catalyst system comprising an activator and the catalyst compound of any of clauses 1 to 20.

Clause 22. The catalyst system of clause 21, further comprising a support material.

Clause 23. The catalyst system of clause 21 or 22, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.

Clause 24. The catalyst system of any of clauses 21 to 23, wherein the activator comprises a non-coordinating anion activator.

Clause 25. The catalyst system of any of clauses 21 to 24, wherein the activator is represented by the formula:

$$(Z)_d^+(A^{d-})$$

wherein Z is (L-H) or a reducible Lewis Acid, L is an Lewis base; H is hydrogen; $(L-H)^+$ is a Bronsted acid; $A^{d-}$ is a non-coordinating anion having the charge d−; and d is an integer from 1 to 3.

Clause 26. The catalyst system of any of clauses 21 to 24, wherein the activator is represented by the formula:

$$(Z)_d^+(A^{d-})$$

wherein $A^{d-}$ is a non-coordinating anion having the charge d−; d is an integer from 1 to 3, and Z is a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.

Clause 27. The catalyst system of any of clauses 21 to 24, wherein the activator is one or more of:
N,N-dimethylanilinium tetrakis(pentafluorophenyl)borate,
dioctadecylmethylammonium tetrakis(pentafluorophenyl) borate,
dioctadecylmethylammonium tetrakis(perfluoronaphthyl) borate,
triphenylcarbenium tetrakis(pentafluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-dimethylanilinium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium) tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
$[4-t-butyl-PhNMe_2H][(C_6F_3(C_6F_5)_2)_4B]$,
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium) tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium) tetrakis(pentafluorophenyl)borate,
trimethylammonium tetrakis-(2,3,4,6-tetrafluorophenyl) borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl) borate,
dimethyl(t-butyl)ammonium tetrakis-(2,3,4,6-tetrafluorophenyl)borate,
N,N-dimethylanilinium tetrakis-(2,3,4,6-tetrafluorophenyl) borate,
N,N-diethylanilinium tetrakis-(2,3,4,6-tetrafluorophenyl) borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl) borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl) borate, tripropylammonium tetrakis(3,5-bis(trifluoromethyl)phenyl)borate,
tri(n-butyl)ammonium tetrakis(3,5-bis(trifluoromethyl)phenyl)borate,
tri(t-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium) tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine, and
triphenylcarbenium tetrakis(3,5-bis(trifluoromethyl)phenyl)borate).

Clause 28. The catalyst system of clause 21, further comprising a metal hydrocarbenyl chain transfer agent represented by the formula:

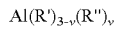

wherein each R' independently is a $C_1$-$C_{30}$ hydrocarbyl group; each $R^{11}$, independently, is a $C_4$-$C_{20}$ hydrocarbenyl group having an end-vinyl group; and v is from 0.1 to 3.

Clause 29. The catalyst system of clause 21, wherein the activator comprises an alkylalumoxane.

Clause 30. The catalyst system of clause 29, wherein the alumoxane is present at a molar ratio of aluminum to catalyst compound transition metal of 100:1 or more.

Clause 31. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of any of clauses 21 to 30, in one or more continuous stirred tank reactors or loop reactors, in series or in parallel, at a reactor pressure of from 0.05 MPa to 1,500 MPa and a reactor temperature of from 30° C. to 230° C. to form an ethylene alpha-olefin copolymer.

Clause 32. The process of clause 31, wherein the ethylene alpha-olefin copolymer has an Mw value of from 10,000 g/mol to 500,000 g/mol, and Mz value of from 10,000 g/mol to 1,500,000 g/mol, an Mn value of 1,000 g/mol to 300,000 g/mol, and a PDI of from 1 to 6.

Clause 33. The process of clause 32, wherein the ethylene alpha-olefin copolymer has a comonomer content of from about 0.00001 wt % to about 8 wt %.

Clause 34. The process of clause 32, wherein the ethylene alpha-olefin copolymer has a melting point of from 130° C. to 150° C.

Examples

Experimental

All anhydrous solvents were purchased from Fisher Chemical and were degassed and dried over molecular sieves prior to use. Deuterated solvents were purchased from Cambridge Isotope Laboratories and dried over molecular sieves prior to use. 2-chloro-4, 6-dimethyl aniline, 2,6-diacetylpyridine, iron chloride and formic acid (95-97%) were purchased from Sigma-Aldrich and used as received. The $^1$H NMR measurements were recorded on a 400 MHz Bruker spectrometer.

Synthesis of 2,6-bis-[1-(2-chloro-4,6-dimethylphenylimino)ethyl]pyridine

Solid 2,6-diacetylpyridine (5.0 g, 31 mmol) was dissolved in methanol (100 mL). Then, a solid 2-chloro-4, 6-dimethyl aniline (9.537 g, 62 mmol) and formic acid (0.5 mL) were added. The resulting mixture was stirred at room temperature for 48 hours, and a colorless solid precipitated out during the course of reaction. Colorless crystalline solids were filtered out and washed with cold methanol. Crude materials $^1$H NMR spectrum showed that three are 1:1 ratio of title precursor compound and starting material 2-chloro-4,6-dimethyl aniline. The desired compound was purified by column chromatography with a mixture of hexane/ethyl acetate (8:2 ratio) as eluent and solvent removal resulted in colorless crystalline solid (2,6-bis-[1-(2-chloro-4,6-dimethylphenylimino)ethyl]pyridine) in 2.5 g (18.6%) yield. $^1$H NMR (400 MHz, $CD_2Cl_2$): δ 2.06 (6H, s, $CH_3$ side arms), 2.29 (6H, s, $CH_3$), 2.31 (6H, s, $CH_3$), 6.99 (2H, s, Ar—CH), 7.11 (2H, s, Ar—CH), 7.95 (1H, t, Ar—CH), 8.47 (2H, d, Ar—CH) ppm.

Synthesis of 2,6-bis-[1-(2-chloro-4,6-dimethylphenylimino)ethyl]pyridine iron dichloride A solid pro-ligand, 2,6-Bis-[1-(2-chloro-4,6-dimethylphenylimino)ethyl]pyridine, was dissolved in THF (40 mL) and cooled to −25° C., to this a solid pre-dried iron chloride was added. The resulting mixture was stirred overnight at room temperature. The resulting mixture color turned from brown to blue during the course of the reaction and the desired iron complex was precipitated out as blue solids. The blue iron compound was filtered out and washed with hexane. The crude materials were further re-dissolved in dichloromethane to remove any insoluble iron containing impurities and ionic compounds formed during the course of the reaction, which could not be identified by $^1$H NMR measurements because of their faster relaxation rate (paramagnetic nature) on NMR timescale. Solvent removal under reduced pressure resulted in blue crystalline solid of the 2,6-bis-[1-(2-chloro-4,6-dimethylphenylimino)ethyl]pyridine iron dichloride in 1.89 g (81.9%) yield. $^1$H NMR (400 MHz, $CD_2Cl_2$): δ−23.2, −21.0, 3.7, 9.1, 12.2, 15.3, 18.4, 19.3, 22.0, 22.2, 32.9, 33.9, 81.9, 84.2 (bs) ppm.

Synthesis of tetrakispyridine iron dichloride $FeCl_2$ (12.3 g, 0.097 mol) was slurried in dichloromethane (300 mL) at room temperature. Neat pyridine (30.7 g, 0.388 mol) was added dropwise. An exothermic reaction resulted as pyridine was added. The resulting solution cooled to room temperature and stirred overnight; during this time, the solution turned from yellow to colorless. Solvents from the reaction mixture were removed in vacuo. The crude materials were extracted using THF (200 mL) and volatiles were removed. The product was obtained as a pale yellow crystalline solid. 55.8% yield.

Synthesis of bispyridine iron disilylneopentyl

Tetrakispyridine iron dichloride (0.890 g, 2.01 mmol) was slurried in ether (40 mL) and pyridine (20 mL) and cooled to −32° C. A 1.0 M solution of $Me_3SiCH_2MgCl$ in diethylether (4.02 mL, 4.02 mmol) was added dropwise. The reaction mixture was stirred for an hour at room temperature. The resulting mixture solvents were removed in vacuo. The desired product was extracted in hexane (20 mL). Solvent was removed in vacuo to yield a dark purple solid. 96.1% yield.

Synthesis of 2,6-bis-[1-(2-chloro-4,6-dimethylphenylimino)ethyl]pyridine iron-silylneopentyl Bispyridine iron disilylneopentyl (0.748 g, 1.93 mmol) and 2,6-bis-[1-(2-chloro-4,6-dimethylphenylimino)ethyl]pyridine (0.844 g, 1.93 mmol) were mixed in THF (30 mL) at −25° C. and stirred overnight at room temperature. The resulting solvent mixture was removed in vacuo to give a red material that was triturated with hexane (50 mL). The red material was completely soluble in hexane and extracted with hexane. Hexane removal from the resulting mixture yielded a red crystalline solid of the desired compound. 58.3% yield.

Synthesis of (E)-N-(2-chloro-4,6-dimethylphenyl)-1-(6-((E)-1-(mesitylimino)ethyl)pyridin-2-yl)ethan-1-imine iron-silylneopentyl, Catalyst 1

Bispyridine iron disilylneopentyl (0.511 g, 1.32 mmol) and (E)-N-(2-chloro-4,6-dimethylphenyl)-1-(6-((E)-1-(mesitylimino)ethyl)pyridin-2-yl)ethan-1-imine (0.550 g, 1.32 mmol) were mixed in THF (20 mL) and stirred overnight at room temperature. Volatiles were removed in vacuo to give a dark purple material that was extracted with pentane (20 mL). The resultant dark purple solution was filtered and taken to dryness in vacuo to yield the desired compound as a dark purple solid. 82.3% yield.

A Comparative Catalyst was used for comparative polymerizations, and the catalyst is represented by the following structure:

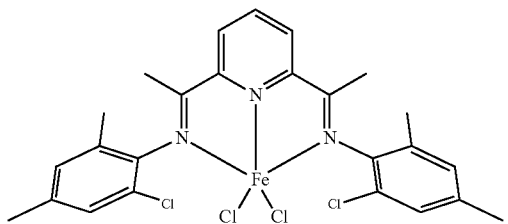

Supportation/Activation of the Comparative Catalyst, Catalyst 1, and Catalyst 2.
SMAO Preparation:
SMAO is methylalumoxane supported on silica ES-70 (PQ Corporation, Conshohocken, Pa.) that has been calcined at 875° C. and was prepared as follows: in a 4 L stirred vessel in a dry box, methylalumoxane (MAO, 30 wt % in toluene, 1,000 grams) was added along with 2,000 g of toluene. The solution was then stirred at 60 RPM for 5 minutes. Then, 800 grams of ES-70-875 silica was added to the vessel. The resulting slurry was heated at 100° C. and stirred at 120 RPM for 3 hours. The temperature was then reduced to 25° C. and cooled to temperature over 2 hours. Once cooled, the vessel was set to 8 RPM and placed under vacuum for 72 hours. After emptying the vessel and sieving the supported MAO, 1,100 g of supported MAO was obtained.
Supported Comparative Catalyst.
A 1.0 g amount of prepared SMAO was stirred in 10 mL of toluene using a Celestir™ vessel. A 0.023 g amount of the Comparative Catalyst was added to the slurry and stirred for 3 hours. The slurry was then filtered, washed with toluene (1×10 mL) and then hexane (2×10 mL). The supported Comparative Catalyst was then dried under vacuum overnight in quantitative yields.
Supported Catalyst 1.
A 1.0 g amount of prepared SMAO was stirred in 10 mL of toluene using a Celestir™ vessel. A 0.028 g amount of Catalyst 1 was added to the slurry and stirred for 3 hours. The slurry was then filtered, washed with toluene (1×10 mL) and then hexane (2×10 mL). The supported Catalyst 1 was then dried under vacuum overnight in quantitative yields.
Supported Catalyst 2.
A 1.0 g amount of prepared SMAO was stirred in 10 mL of toluene using a Celestir™ vessel. A 0.030 g amount of Catalyst 2 was added to the slurry and stirred for 3 hours. The slurry was then filtered, washed with toluene (1×10 mL) and then hexane (2×10 mL). The supported Catalyst 2 was then dried under vacuum overnight in quantitative yields.
Solubility Tests:
Into a vial was placed 0.097 g of 2,6-bis-[1-(2-chloro-4,6-dimethylphenylimino)ethyl]pyridine iron-silylneopentyl with 2.007 g of anhydrous hexane. This solution was stirred for 30 minutes at room temperature. The contents were then filtered through a buchner filter funnel with a frit having a 4-5.5 micron size. The solvent was then removed en vacuo. The calculated solubility was found to be 5.0 g/g hexane.

Comparitive: Into a vial was placed 0.077 g 2,6-bis-[1-(2-chloro-4,6-dimethylphenylimino)ethyl]pyridine iron dichloride with 2.008 g of anhydrous hexane (Sigma Aldrich). This solution was stirred for 30 minutes at room temperature. The contents were then filtered through a buchner filter funnel with a frit having a 4-5.5 micron size. The solvent was then removed en vacuo. The calculated solubility was found to be 0.0 g/g hexane and there were no visible signs of the blue-colored compound after filtration.
General Procedure for High Throughput Ethylene/1-Hexene Polymerization and Polymer Characterization.
All molecular weights are reported in g/mol unless otherwise noted.
High Throughput Ethylene-1-Hexene Copolymerization.
Supported catalysts were tested in a high throughput unit in slurry ethylene-1-hexene copolymerization.
Preparation of Catalyst Slurry for High Throughput Run.
In a dry box, 45 mg of supported catalyst (1.79 micromoles of catalyst per 45 mgs of SMAO) was weighed into a 20 ml glass vial. 15 ml of toluene was added to the vial to make a slurry that contained 3 mg supported catalyst/ml slurry. The resulting mixture was vortexed prior to injection.
High Throughput—Polymerizations.
Transition metal compounds were supported as detailed in the examples above. Solvents, polymerization grade toluene and isohexane were supplied by ExxonMobil Chemical Company and thoroughly dried and degassed prior to use. Polymerization grade ethylene was used and further purified by passing it through a series of columns: 500 $cm^3$ Oxyclear™ cylinder from Labclear (Oakland, Calif.) followed by a 500 cm³ column packed with dried 3 Å molecular sieves purchased from Aldrich Chemical Company, and a 500 cm³ column packed with dried 5 Å molecular sieves purchased from Aldrich Chemical Company. TnOAl was used as a 2 mmol/L solution in toluene.

Reactor Description and Preparation.

Polymerizations were conducted in an inert atmosphere ($N_2$) dry box using autoclaves equipped with an external heater for temperature control, glass inserts (internal volume of reactor=22.5 mL), septum inlets, regulated supply of nitrogen, ethylene and hexene, and equipped with disposable PEEK mechanical stirrers (800 RPM). The autoclaves were prepared by purging with dry nitrogen prior to use.

Ethylene/1-Hexene Copolymerization.

The reactor was prepared as described above, and then purged with ethylene. Isohexane, 1-hexene and TnOAl were added via syringe at room temperature and atmospheric pressure. The reactor was then brought at a process temperature (85° C.) and charged with ethylene at a process pressure (130 psig=896 kPa).

Table 1 illustrates the results of polymers having different properties that were obtained by the polymerization of ethylene in the presence of 300 ppm $H_2$, while stirring at 800 RPM. The transition metal compound (100 μL of a 3 mg/mL toluene slurry, unless indicated otherwise) was added via syringe to the reactor at process conditions. TnOAl was used as 200 μL of a 20 mmol/L in isohexane solution. Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 50 psi $O_2$/Ar (5 mole % $O_2$) gas mixture to the autoclaves for approximately 30 seconds. The polymerizations were quenched after a predetermined cumulative amount of ethylene had been added or for a maximum of 45 minutes polymerization time. The final conversion (in psi) of ethylene added/consumed was reported in Table 1, in addition to the quench time for each run. The reactors were cooled and vented. The polymer was isolated after the solvent was removed in vacuo. Yields reported in Table 1 include the total weight of polymer and the residual catalyst.

Table 1 illustrates the results obtained for the polymers formed by polymerization of ethylene in presence of 300 ppm $H_2$, using a Comparative Catalyst, Catalyst 2, or Catalyst 1. With Catalyst 2 and Catalyst 1 (each including both silyl neopentyl moieties), Catalyst 2 and Catalyst 1 were found to have a significantly improved solubility in hydrophobic (nonpolar) solvents, as well as an improved Mw capability (e.g., Table 1, Runs 7 to 18), when compared to the Comparative Catalyst. Narrow PDI values were observed for the polymers formed using the Comparative Catalyst, Catalyst 2, or Catalyst 1, with Catalyst 1 leading to the production of polymers with PDI values higher than that of the Comparative Catalyst and Catalyst 2 (e.g., Table 2, Runs 16 to 18). Significantly, Catalyst 2 and Catalyst 1 improved Mw capability (higher molecular weight polymers were obtained using Catalyst 2 and Catalyst 1, as compared to the polymers obtained with the Comparative Catalyst) as compared to the Comparative Catalyst (35,669 g/mol), thus with an average Mw value of 51,553 g/mol for Catalyst 2, and an average Mw value of 180,324 g/mol for Catalyst 1. It was also observed that little to no hexene was incorporated (e.g., Table 1, Runs 7 to 18; comonomer content of 0 wt % to 2.072 wt %). In particular, it was observed that Catalyst 1 did not incorporate hexene at all. According to the results obtained using Catalyst 2 and Catalyst 1, it was observed that the nature of the ligand and the substituents in the ortho positions included in the iron catalysts exhibited a significant effect to the range of Mw values. Hence, the iron-catalysts can provide polymers with tailored Mw, comonomer content and Tm, enabling access to desirable properties needed at the industrial scale, for example. With Catalyst 2, a low average Mw value was observed, when compared to Catalyst 1, but still higher than the average Mw value observed with the Comparative Catalyst. In contrast, with Catalyst 1, a high average Mw value was observed, when compared to the Comparative Catalyst and Catalyst 2. Furthermore, Catalyst 2 and Catalyst 1 both provided polymers having high Tm values (e.g, Table 1, Runs 7 to 18; Tm of from 131° C. to 134° C.). Catalyst 1 produced polymers with higher Tm, when compared to the Comparative Catalyst and Catalyst 2 (Table 1, Runs 14 to 18). Table 1.

TABLE 1

| Run | Catalyst | yield (g) | GPC Average Mw (g/mol) | GPC Average Mn (g/mol) | GPC Average Mz (g/mol) | GPC Average PDI |
|---|---|---|---|---|---|---|
| 1 | Comparative | 0.089 | 32,064 | 12,863 | 90,231 | 2.493 |
| 2 | Catalyst | 0.086 | 32,487 | 16,427 | 77,878 | 1.978 |
| 3 | | 0.083 | 37,253 | 17,473 | 124,265 | 2.132 |
| 4 | | 0.088 | 37,486 | 17,050 | 116,320 | 2.199 |
| 5 | | 0.082 | 37,741 | 18,641 | 127,190 | 2.025 |
| 6 | | 0.088 | 37,163 | 16,466 | 123,727 | 2.257 |

Table 2. (Cont.)

| Run | Catalyst | yield (g) | GPC Average Mw (g/mol) | GPC Average Mn (g/mol) | GPC Average Mz (g/mol) | GPC Average PDI |
|---|---|---|---|---|---|---|
| | Average | | 35,699 | | | |
| 7 | Catalyst 2 | 0.061 | 36,472 | 9,552 | 114,205 | 3.818 |
| 8 | | 0.072 | 46,346 | 19,257 | 146,448 | 2.407 |
| 9 | | 0.075 | 56,281 | 20,929 | 242,957 | 2.689 |
| 10 | | 0.073 | 60,556 | 19,313 | 306,322 | 3.135 |
| 11 | | 0.076 | 59,832 | 22,110 | 246,843 | 2.706 |
| 12 | | 0.073 | 49,834 | 19,532 | 166,333 | 2.551 |
| | Average | | 51,553 | | | |
| 13 | Catalyst 1 | 0.133 | | | | |
| 14 | | 0.08 | 164,599 | 43,993 | 758,565 | 3.741 |
| 15 | | 0.08 | 168,115 | 46,404 | 703,628 | 3.623 |
| 16 | | 0.078 | 181,766 | 38,508 | 977,750 | 4.72 |
| 17 | | 0.082 | 210,903 | 36,248 | 1,436,455 | 5.818 |
| 18 | | 0.069 | 176,237 | 39,799 | 878,784 | 4.428 |
| | Average | | 180,324 | | | |

Table 3. (Cont.)

| Run | Catalyst | FTIR Hexene Incorporated (wt %) | Hexene in reactor (μl) | Polymer Time (s) | Peak Tm (° C.) 1st Heat |
|---|---|---|---|---|---|
| 1 | Comparative | 1.594 | 300 | 304.7 | 130.7 |
| 2 | Catalyst | 0.35 | 180 | 294.7 | 131.4 |
| 3 | | 0.23 | 180 | 327.7 | 131.6 |
| 4 | | 0.233 | 60 | 314.2 | 132.1 |
| 5 | | 0.465 | 60 | 299 | 131.6 |
| 6 | | 0.347 | 30 | 296.6 | 131.6 |
| 7 | Catalyst 2 | 2.072 | 300 | 1,195.8 | 131.0 |
| 8 | | 0 | 180 | 1,983 | 132.3 |
| 9 | | 0.012 | 180 | 2,219.6 | 132.3 |
| 10 | | 0 | 60 | 1,479.1 | 132.3 |
| 11 | | 0 | 60 | 2,197.32 | 132.8 |
| 12 | | 0 | 30 | 1,402 | 132.5 |

TABLE 1-continued

Table 4. (Cont.)

| Run | Catalyst | FTIR Hexene Incorporated (wt %) | Hexene in reactor (μL) | Polymer Time (s) | Peak Tm (° C.) 1st Heat |
|---|---|---|---|---|---|
| 13 | Catalyst 1 | | 300 | 1,231 | |
| 14 | | 0 | 180 | 680 | 134 |
| 15 | | 0 | 180 | 703 | 134 |
| 16 | | 0 | 60 | 675 | 134 |
| 17 | | 0 | 60 | 735 | 134 |
| 18 | | 0 | 30 | 2,701 | 134 |

Table 2 illustrates the results of different properties obtained after the polymerization of ethylene in the absence of $H_2$, while stirring at 800 RPM. The transition metal compound (100 μL of a 3 mg/mL toluene slurry, unless indicated otherwise) was added via syringe to the reactor at process conditions. TnOAl was used as 200 μL of a 20 mmol/L in isohexane solution. Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 50 psi 02/Ar (5 mole % 02) gas mixture to the autoclaves for approximately 30 seconds. The polymerizations were quenched after a predetermined cumulative amount of ethylene had been added or for a maximum of 45 minutes polymerization time. The final conversion (in psi) of ethylene added/consumed was reported in Table 2, in addition to the quench time for each run. The reactors were cooled and vented. The polymer was isolated after the solvent was removed in vacuo. Yields reported in Table 2 include the total weight of polymer and the residual catalyst.

The resulting polymer was analyzed by Rapid GPC to determine the molecular weight. To determine various molecular weight related values by GPC, high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388. This apparatus has a series of three 30 cm×7.5 mm linear columns, each containing PLgel 10 um, Mix B. The GPC system was calibrated using polystyrene standards ranging from 580 g/mol-3,390,000 g/mol. The system was operated at an eluent flow rate of 2.0 mL/min and an oven temperature of 165° C. 1,2,4-trichlorobenzene was used as the eluent. The polymer samples were dissolved in 1,2,4-trichlorobenzene at a concentration of 0.1 mg/mL-0.9 mg/mL. 250 μL of a polymer solution was injected into the system. The concentration of the polymer in the eluent was monitored using an evaporative light scattering detector. The molecular weights presented in the examples are relative to linear polystyrene standards.

Hexene comonomer content in ethylene-hexene copolymer samples was determined by infrared spectroscopic analysis. Samples for infrared analysis were prepared by depositing the stabilized polymer solution onto a silanized wafer (Part number S10860, Symyx). By this method, approximately between 0.12 mg and 0.24 mg of polymer is deposited on the wafer cell. The samples were subsequently analyzed on a Bruker Equinox 55 FTIR spectrometer equipped with Pikes's MappIR specular reflectance sample accessory. Spectra, covering a spectral range of 5,000 $cm^{-1}$ to 500 $cm^{-1}$, were collected at a 2 $cm^{-1}$ resolution with 32 scans. For ethylene-1-hexene copolymers, the wt % comonomer was determined via measurement of the methyl deformation band at ~1,375 $cm^{-1}$. The peak height of this band was normalized by the combination and overtone band at ~4,321 $cm^{-1}$, which corrects for path length differences. The normalized peak height was correlated to individual calibration curves from $^1$H NMR data to predict the wt % comonomer content within a concentration range of ~2 wt % to 35 wt % for hexene.

As shown in Table 2, results were obtained for the polymerization of ethylene in absence of $H_2$, comparing the Comparative Catalyst, Catalyst 2, and Catalyst 1. Higher molecular weight values of the polymers formed by polymerization in the presence of $H_2$ (Table 1), using the Comparative Catalyst, Catalyst 2, or Catalyst 1, were observed, as compared to the molecular weight values of the polymers formed by polymerization in the absence of $H_2$(Table 2). Despite the molecular weight reducing effect of polymerizations performed in the absence of $H_2$, Catalyst 2 and Catalyst 1 were yet found to have a significantly improved solubility, as well as an improved Mw capability (polymers with higher molecular weights were obtained, as compared to polymers obtained using the Comparative Catalyst) (e.g., Table 2, Runs 7 to 18), when compared the Comparative Catalyst. Narrow PDI values were observed for the polymers formed using the Comparative Catalyst, Catalyst 2, or Catalyst 1, with Catalyst 1 leading to the production of polymers with PDI values higher than that of the Comparative Catalyst and Catalyst 2 (e.g., Table 2, Runs 14 to 18). Significantly, Catalyst 2 and Catalyst 1 improved Mw capability, as compared to the Comparative Catalyst (30,872 g/mol), thus with an average Mw values of 41,545 g/mol for Catalyst 2, and an average Mw value of 153,848 g/mol for Catalyst 1. It was also observed that little to no hexene was incorporated (e.g., Table 2, Runs 7 to 18; comonomer content of 0 wt % to 1.656 wt %). In particular, it was observed that Catalyst 1 did not incorporate hexene at all. According to the results obtained using Catalyst 2 and Catalyst 1, it was observed that the nature of the ligand and the substituents in the ortho positions of the iron catalysts exhibited a significant effect to the range of Mw. Hence, the iron-catalysts can provide polymers with tailored Mw, comonomer content and Tm, enabling access to polymers having desirable properties needed at the industrial scale, for example. With Catalyst 2, a low average Mw value was observed, when compared to Catalyst 1, but still higher than the average Mw value observed with the Comparative Catalyst. In contrast, with Catalyst 1, a high average Mw value was observed, when compared to the Comparative Catalyst and Catalyst 2. Furthermore, Catalyst 2 and Catalyst 1 both provided polymers having high Tm values (e.g, Table 2, Runs 7 to 18; Tm of from 130° C. to 134° C.) Catalyst 1 produced polymers with higher Tm, when compared to the Comparative Catalyst and Catalyst 2 (Table 2, Runs 14 to 18).

TABLE 2

| Run | Catalyst | yield (g) | GPC Average Mw (g/mol) | GPC Average Mn (g/mol) | GPC Average Mz (g/mol) | GPC Average PDI |
|---|---|---|---|---|---|---|
| 1 | Comparative | 0.088 | 33,254 | 16,450 | 94,764 | 2.02 |
| 2 | Catalyst | 0.087 | 27,584 | 16,123 | 54,885 | 1.71 |
| 3 | | 0.084 | 31,592 | 14,297 | 88,798 | 2.21 |
| 4 | | 0.077 | 30,140 | 11,662 | 89,151 | 2.58 |
| 5 | | 0.084 | 30,074 | 12,755 | 80,104 | 2.35 |
| 6 | | 0.086 | 32,590 | 13,751 | 104,654 | 2.37 |
| | Average | | 30,872 | | | |

TABLE 2-continued

| Run | Catalyst | | | | | |
|---|---|---|---|---|---|---|
| 7 | Catalyst 2 | 0.058 | 41,517 | 22,167 | 134,549 | 1.87 |
| 8 | | 0.07 | 37,841 | 11,771 | 145,034 | 3.21 |
| 9 | | 0.07 | 42,807 | 17,016 | 144,864 | 2.51 |
| 10 | | 0.071 | 35,026 | 15,131 | 92,998 | 2.31 |
| 11 | | 0.077 | 50,339 | 18,423 | 209,754 | 2.73 |
| 12 | | 0.072 | 41,740 | 20,841 | 111,995 | 2.00 |
| | Average | | 41,545 | | | |
| 13 | Catalyst 1 | 0.124 | | | | |
| 14 | | 0.078 | 150,958 | 31,560 | 726,069 | 4.783 |
| 15 | | 0.077 | 161,664 | 40,401 | 742,536 | 4.002 |
| 16 | | 0.079 | 182,073 | 30,712 | 1,069,335 | 5.928 |
| 17 | | 0.079 | 137,952 | 37,314 | 605,045 | 3.697 |
| 18 | | 0.078 | 136,593 | 35,534 | 616,082 | 3.844 |
| | Average | | 153,848 | | | |

| Run | Catalyst | FTIR Hexene Incorporated (wt %) | Hexene in reactor (μl) | Peak Tm (° C.) 1st Heat |
|---|---|---|---|---|
| 1 | Comparative | 0.222 | 300 | 130 |
| 2 | Catalyst | 0.046 | 180 | 131 |
| 3 | | 0.398 | 180 | 132 |
| 4 | | 1.689 | 60 | 132 |
| 5 | | 2.634 | 60 | 132 |
| 6 | | 1.1 | 30 | 132 |
| 7 | Catalyst 2 | 1.656 | 300 | 130 |
| 8 | | 0.152 | 180 | 131 |
| 9 | | 0.043 | 180 | 131 |
| 10 | | 0.164 | 60 | 131 |
| 11 | | 1.312 | 60 | 132 |
| 12 | | 0.609 | 30 | 132 |
| 13 | Catalyst 1 | | 300 | |
| 14 | | 0 | 180 | 134 |
| 15 | | 0 | 180 | 134 |
| 16 | | 0 | 60 | 134 |
| 17 | | 0 | 60 | 134 |
| 18 | | 0 | 30 | 134 |

Overall, catalysts, catalyst systems, and processes of the present disclosure can provide polyolefins with high or low molecular weight, low comonomer content, and narrow polydispersity indices. Furthermore, the present disclosure provides new and improved catalyst systems for the polymerization of olefins in order to achieve increased activity or enhanced polymer properties, to increase conversion or comonomer incorporation, or to alter comonomer distribution. In addition, iron-containing catalyst compounds of the present disclosure can have enhanced solubility in hydrophobic (nonpolar) solvents as compared to conventional iron catalyst compounds. In addition, the molecular weight of polymers formed by catalyst compounds of the present disclosure may be substantially or completely unaffected during a polymerization process in the presence of hydrogen in a polymerization reactor.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A catalyst compound, wherein the catalyst compound is selected from:

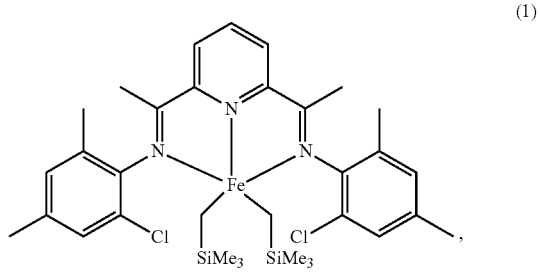

(1)

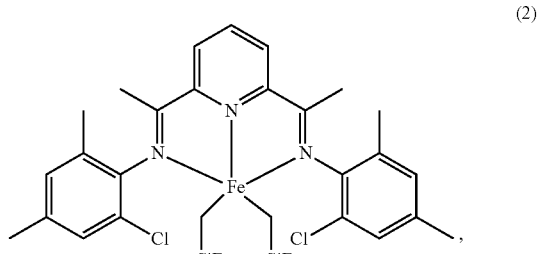

(2)

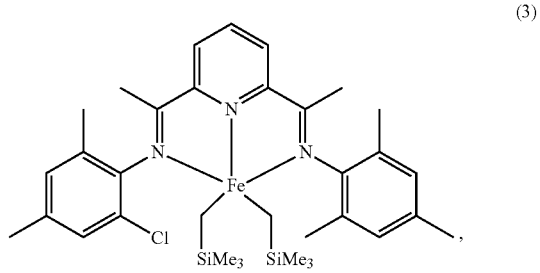

(3)

-continued
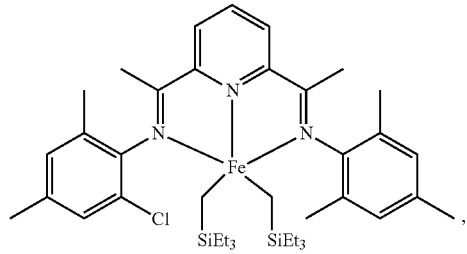
(4)
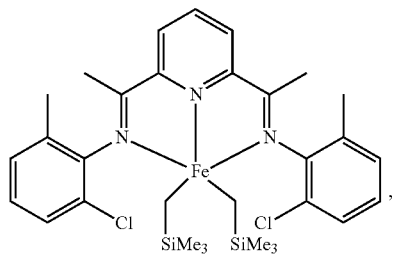
(5)
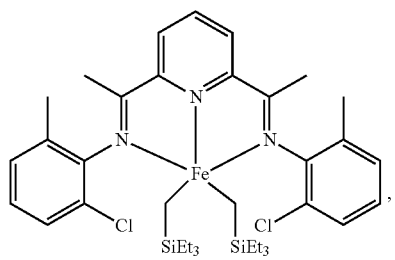
(6)
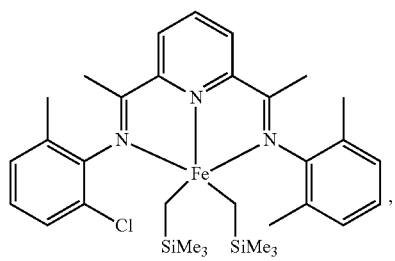
(7)
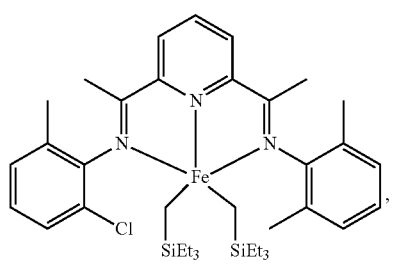
(8)
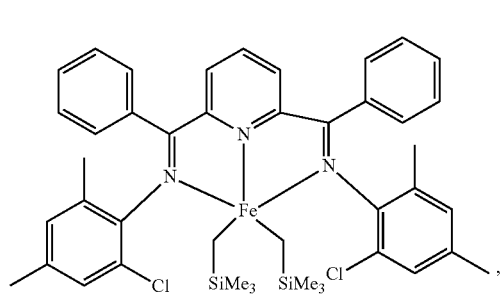
(9)
-continued
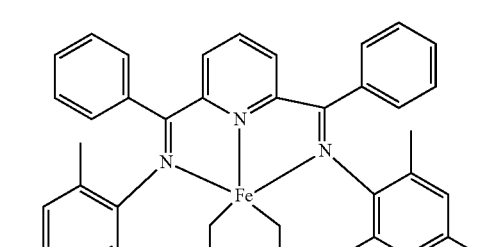
(10)
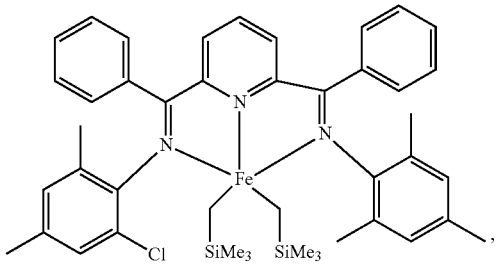
(11)
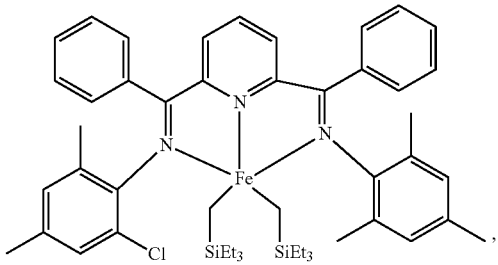
(12)
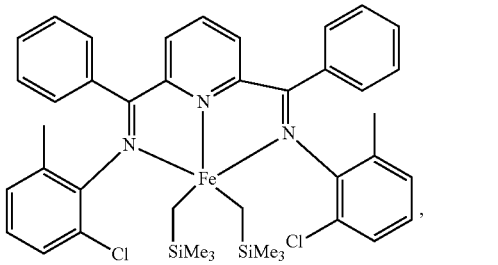
(13)
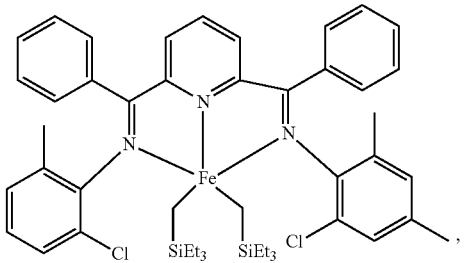
(14)

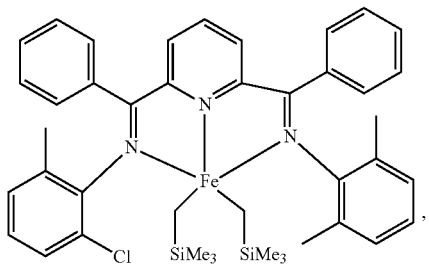
(15)
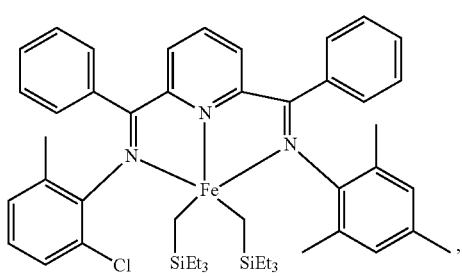
(16)
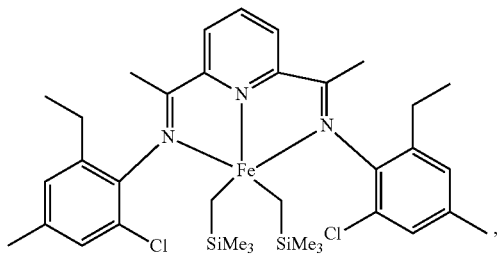
(17)
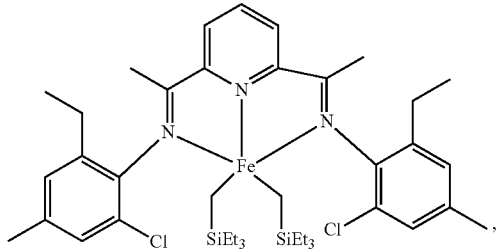
(18)
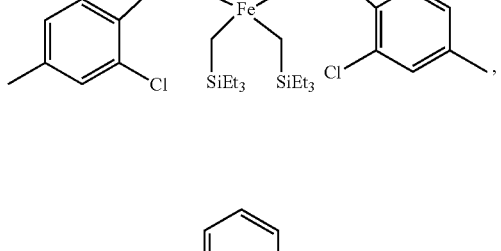
(19)
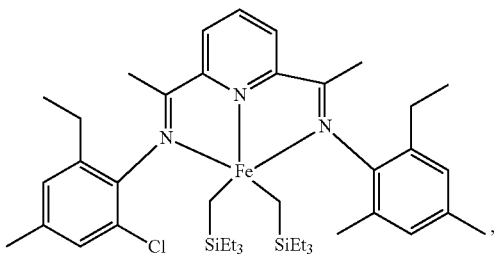
(20)
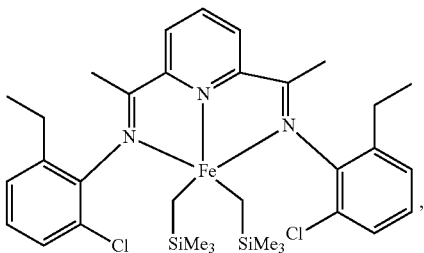
(21)
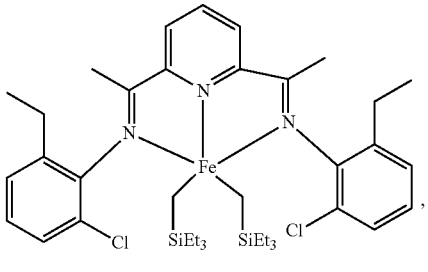
(22)
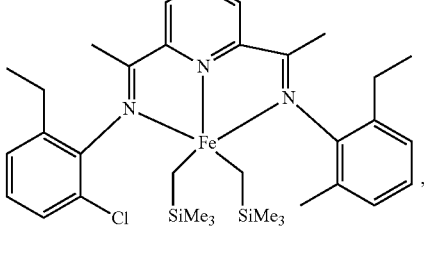
(23)
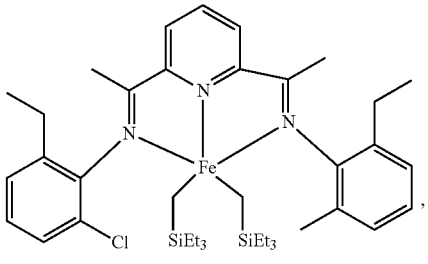
(24)
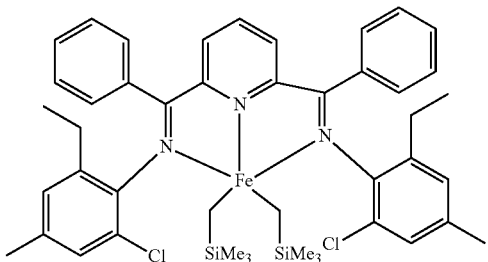
(25)

(26)
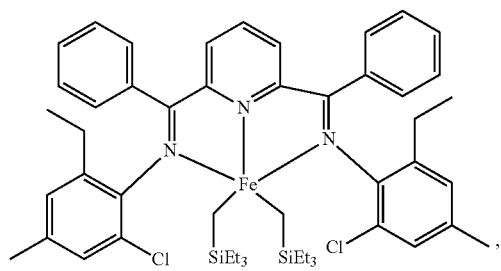
(27)
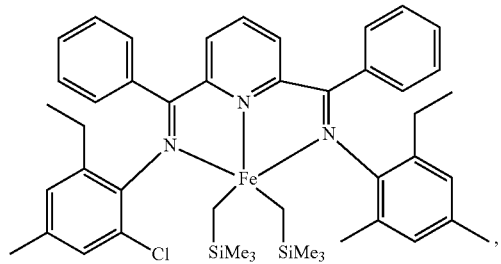
(28)
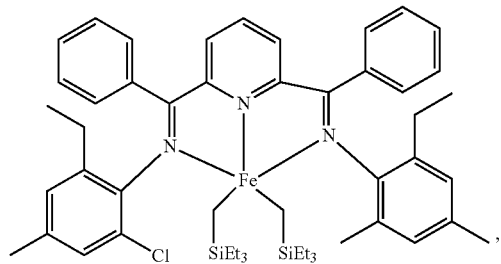
(29)
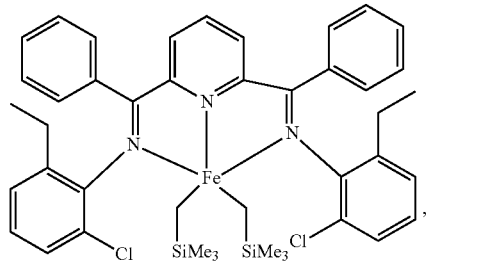
(30)
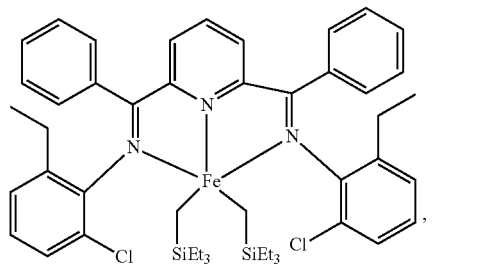
(31)
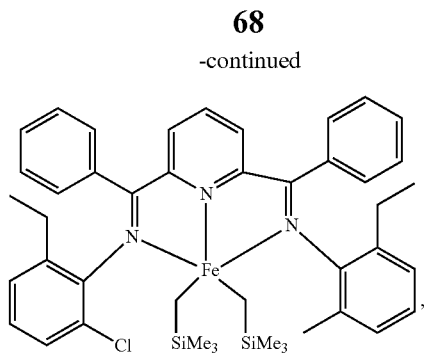
(32)
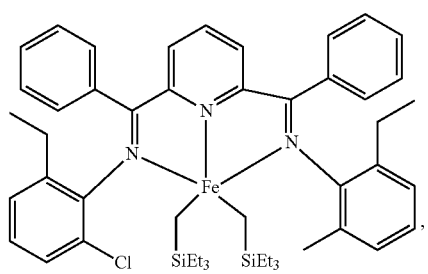
(33)
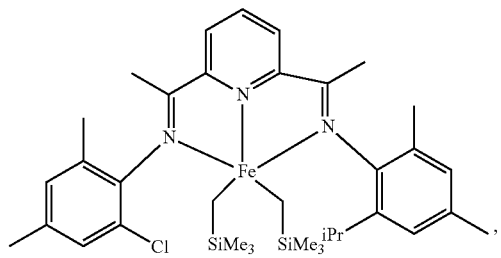
(34)
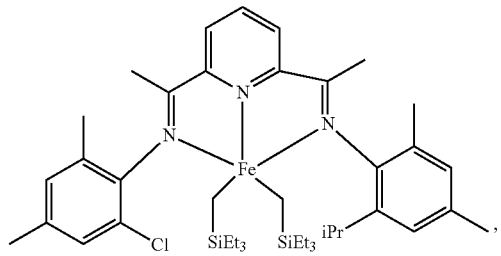
(35)
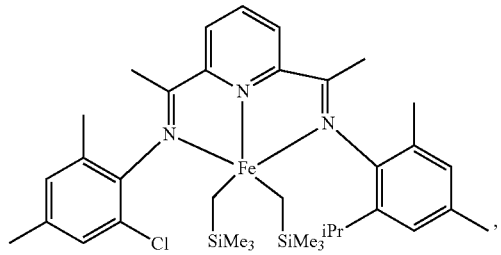

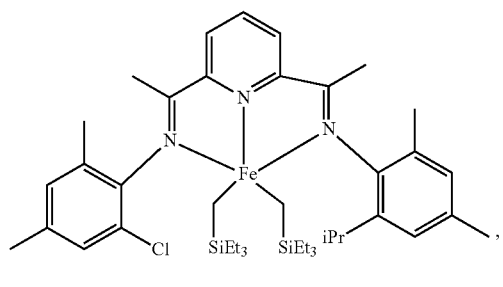
(36)
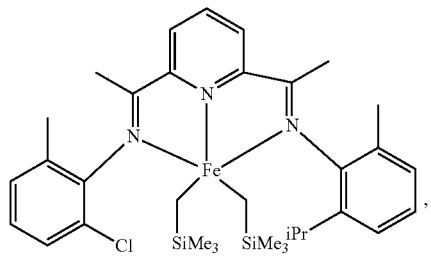
(37)
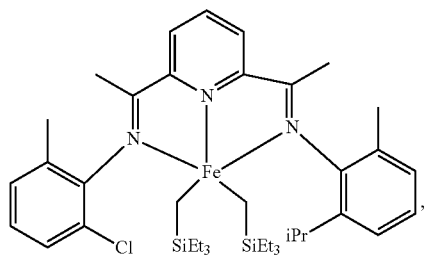
(38)
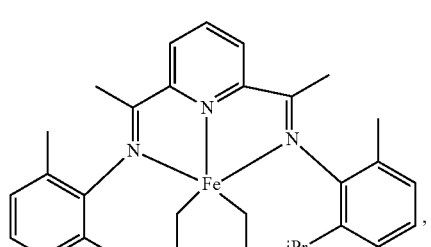
(39)
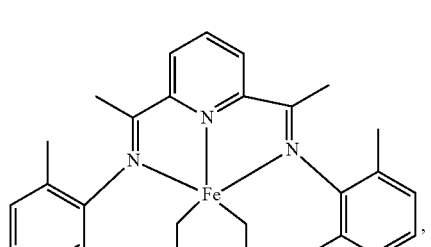
(40)
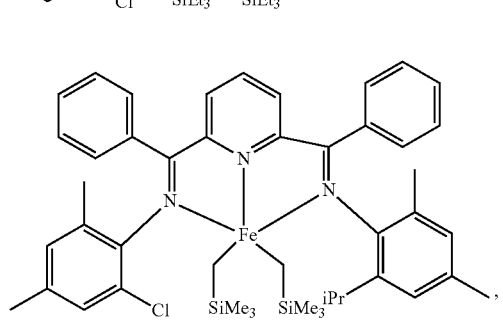
(41)
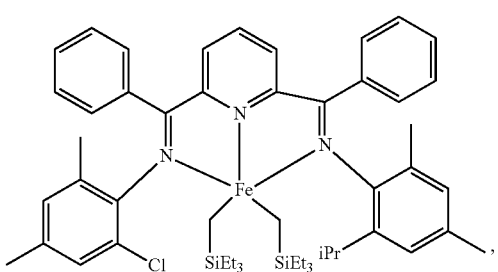
(42)
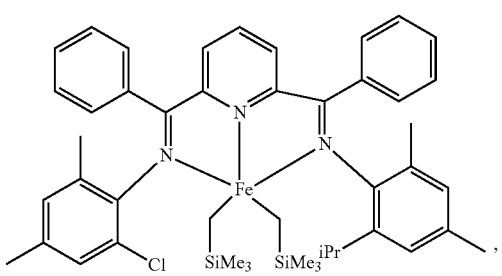
(43)
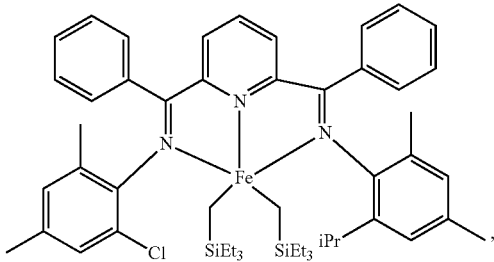
(44)
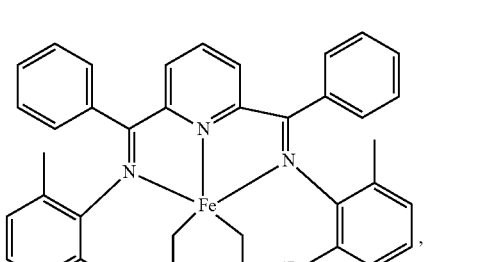
(45)
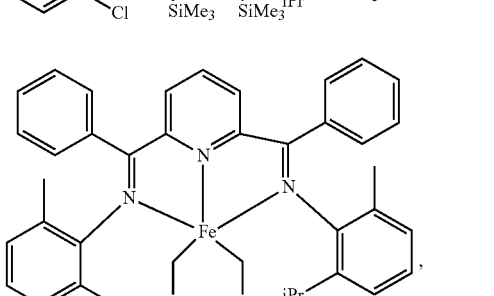
(46)

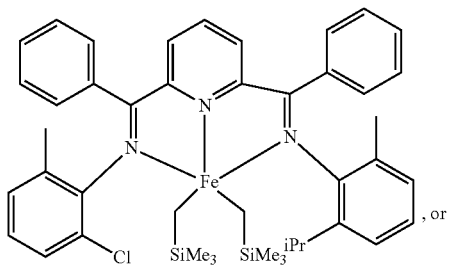
(47)
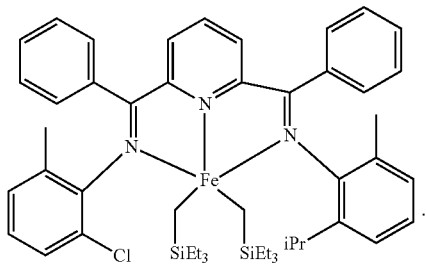
(48)
2. The catalyst compound of claim 1, wherein the catalyst compound is selected from:
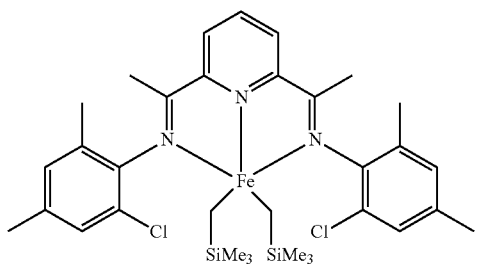
(1)
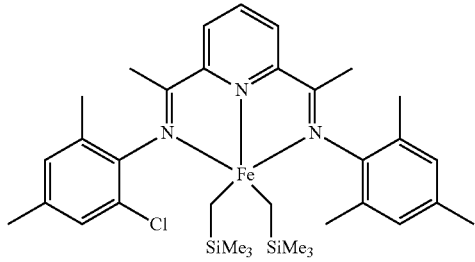
(3)
3. The catalyst compound of claim 1, wherein the catalyst compound is selected from:
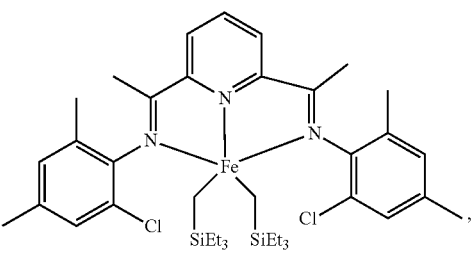
(2)
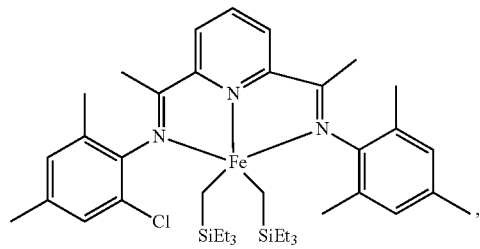
(4)
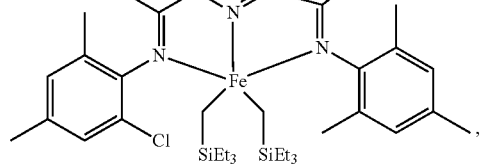
(5)
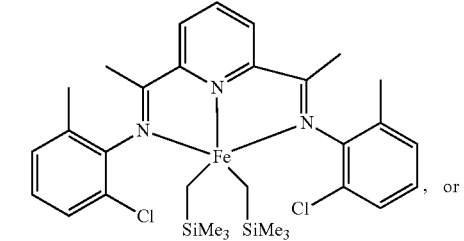
(6)
4. The catalyst compound of claim 1, wherein the catalyst compound is selected from:
(7)
(8)

-continued
(9)
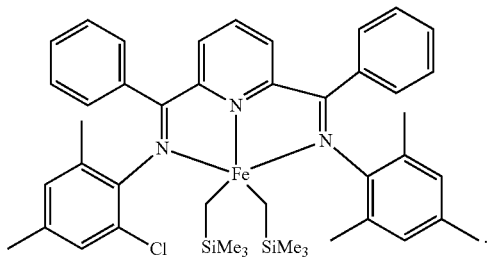
5. The catalyst compound of claim 1, wherein the catalyst compound is selected from:
(10)
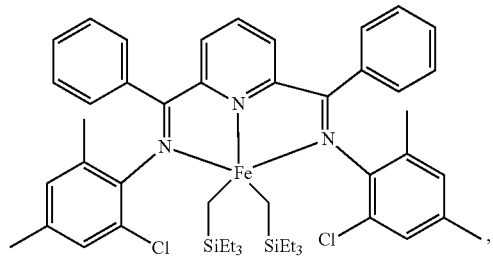
(11)
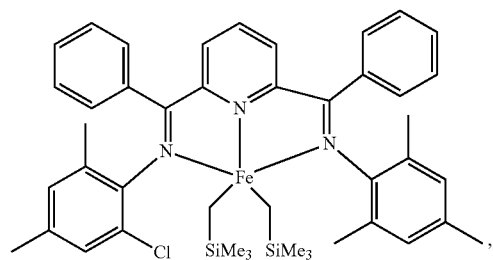
(12)
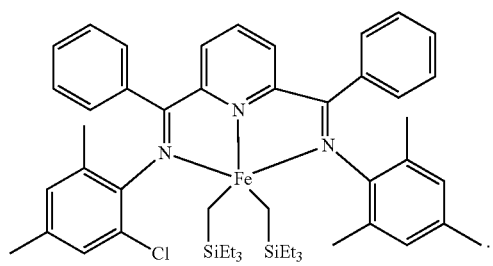
6. The catalyst compound of claim 1, wherein the catalyst compound is selected from:
(13)
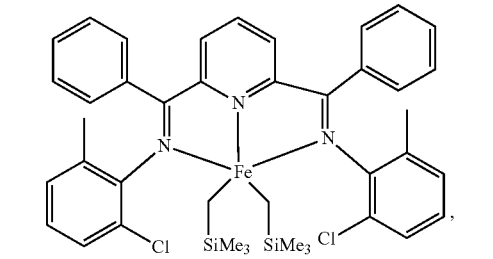
-continued
(14)
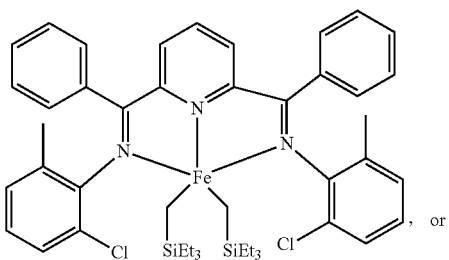, or
(15)
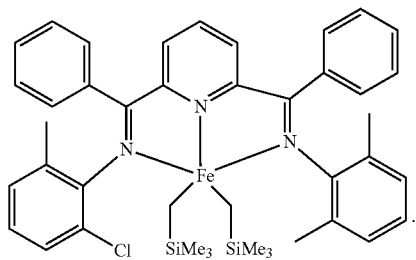.
7. The catalyst compound of claim 1, wherein the catalyst compound is selected from:
(16)
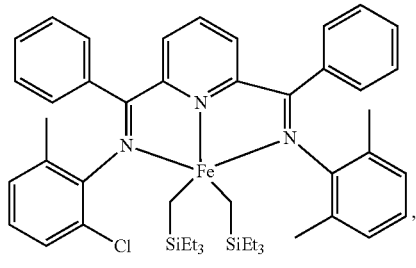,
(17)
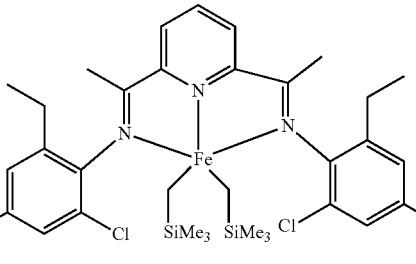, or
(18)
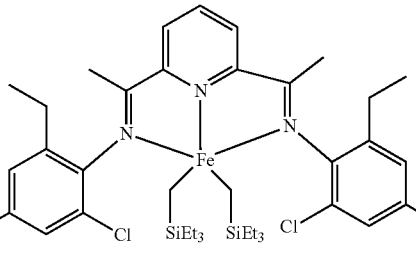.

8. The catalyst compound of claim 1, wherein the catalyst compound is selected from:
(19)
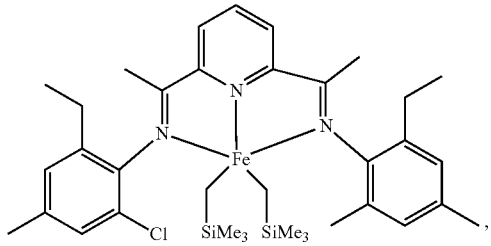
(20)
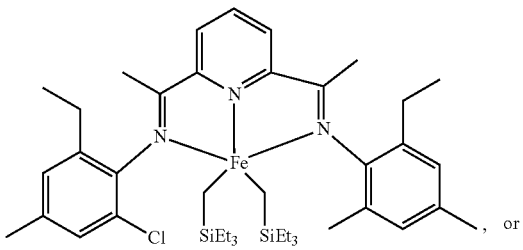, or
(21)
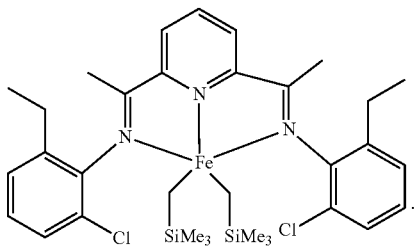.
9. The catalyst compound of claim 1, wherein the catalyst compound is selected from:
(22)
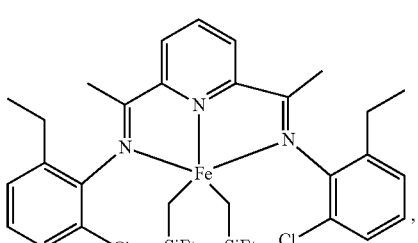,
(23)
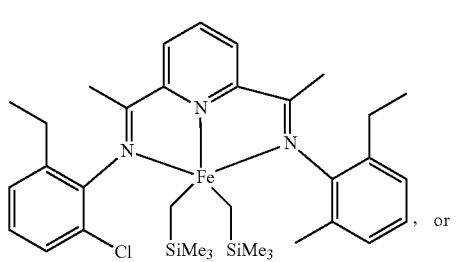, or
(24)
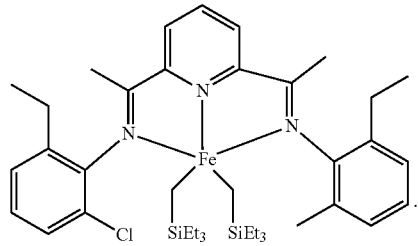.
10. The catalyst compound of claim 1, wherein the catalyst compound is selected from:
(25)
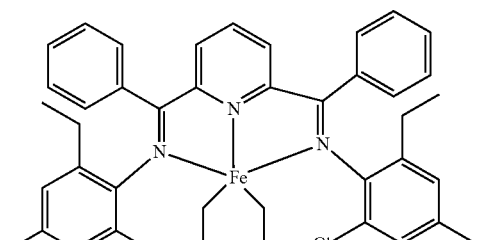,
(26)
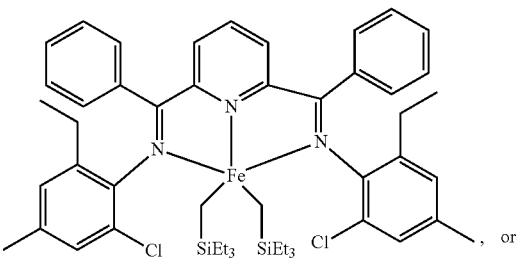, or
(27)
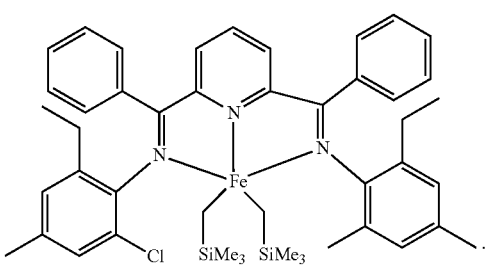.
11. The catalyst compound of claim 1, wherein the catalyst compound is selected from:
(28)
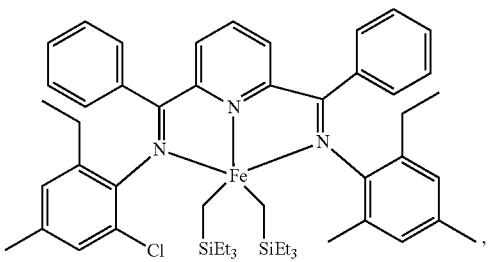,

(29)
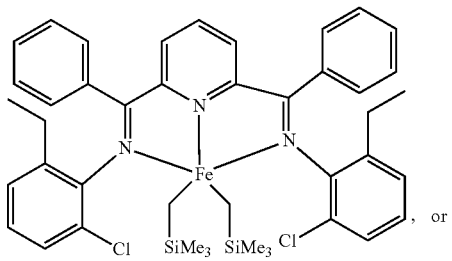
, or
(30)
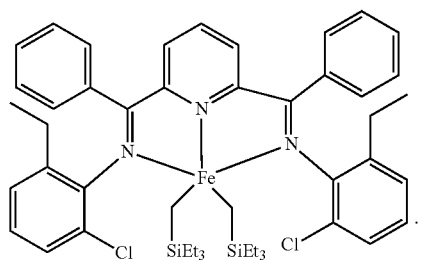
.
12. The catalyst compound of claim 1, wherein the catalyst compound is selected from:
(31)
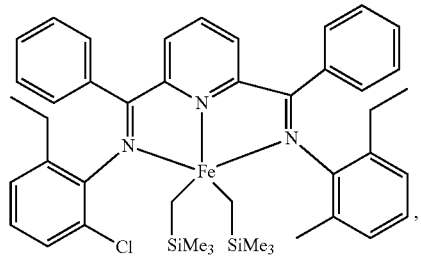
,
(32)
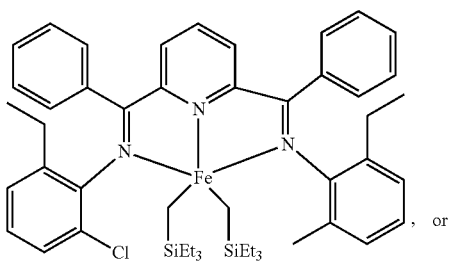
, or
(33)
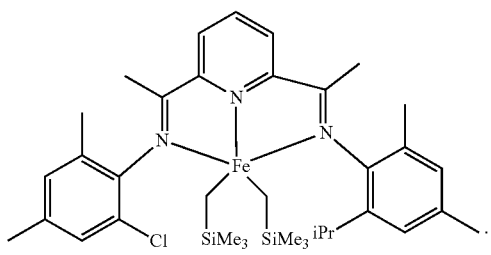
.
13. The catalyst compound of claim 1, wherein the catalyst compound is selected from:
(34)
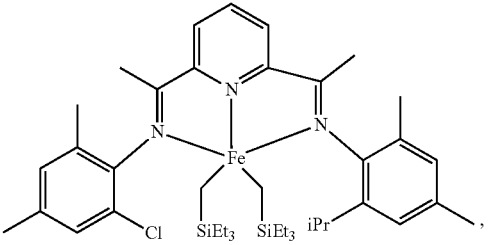
,
(35)
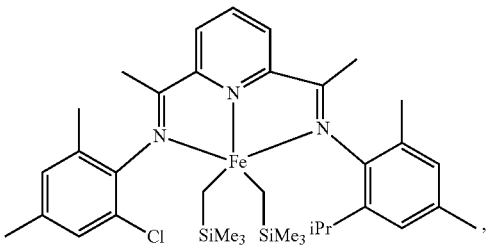
, or
(36)
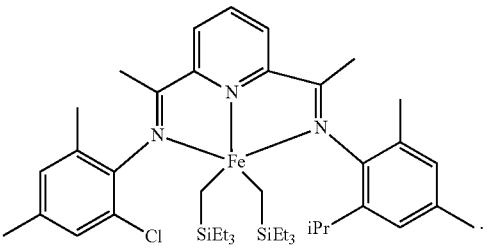
.
14. The catalyst compound of claim 1, wherein the catalyst compound is selected from:
(37)
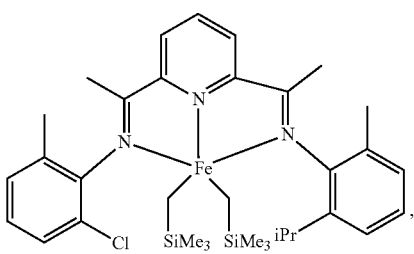
,
(38)
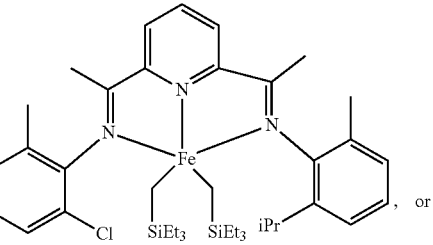
, or (39)

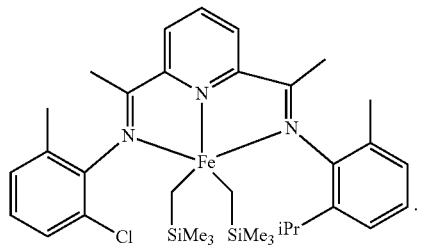

15. The catalyst compound of claim 1, wherein the catalyst compound is selected from:

(40)

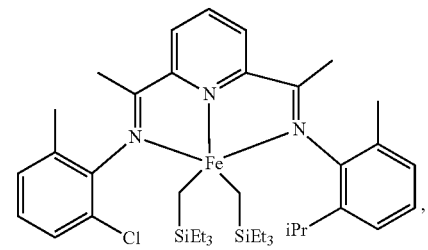

(41)

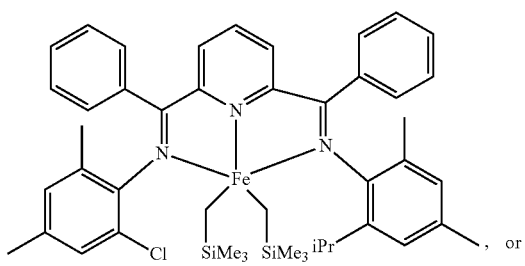

, or (42)

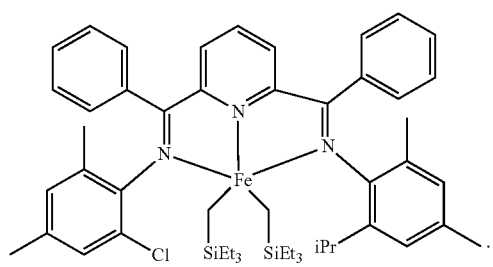

.

16. The catalyst compound of claim 1, wherein the catalyst compound is selected from:

(43)

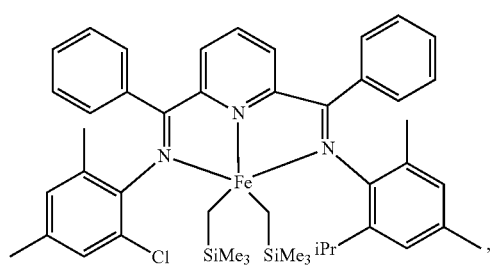

, (44)

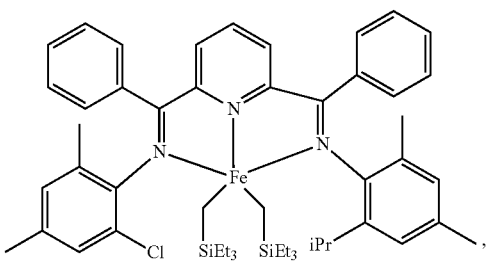

, (45)

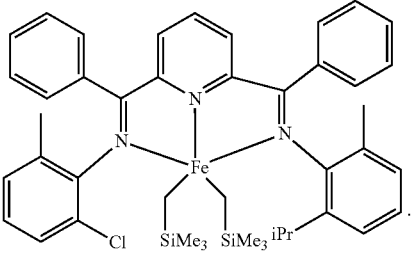

, (46)

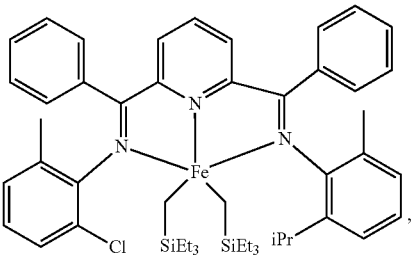

, (47)

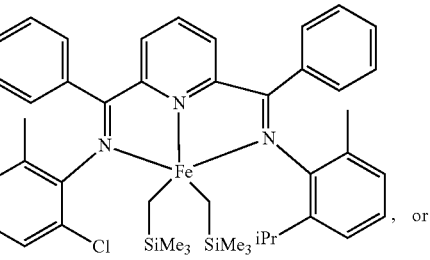

, or (48)

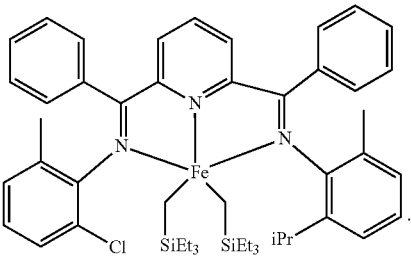

.

17. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system including the catalyst compound of claim 1, in one or more continuous stirred tank reactors or loop reactors, in series or in parallel, at a reactor pressure of from 0.05 MPa to 1,500 MPa and a reactor temperature of from 30° C. to 230° C. to form an ethylene alpha-olefin copolymer.

18. The process of claim 17, wherein the ethylene alpha-olefin copolymer has an Mw value of from 10,000 g/mol to 500,000 g/mol, and Mz value of from 10,000 g/mol to 1,500,000 g/mol, an Mn value of 1,000 g/mol to 300,000 g/mol, and a PDI of from 1 to 6.

19. The process of claim 18, wherein the ethylene alpha-olefin copolymer has a comonomer content of from about 0.00001 wt % to about 8 wt %.

20. The process of claim 19, wherein the ethylene alpha-olefin copolymer has a melting point of from 130° C. to 150° C.

* * * * *